United States Patent
Ikeda et al.

(10) Patent No.: US 7,244,804 B2
(45) Date of Patent: Jul. 17, 2007

(54) POLYCARBONATE COPOLYMER, RESIN COMPOSITION, AND MOLDED ARTICLE

(75) Inventors: Koki Ikeda, Chiyoda-ku (JP);
Toshimasa Tokuda, Chiyoda-ku (JP);
Hiroshi Shuto, Chiyoda-ku (JP);
Manabu Matsui, Chiyoda-ku (JP);
Toshiyuki Miyake, Chiyoda-ku (JP);
Kazushi Tando, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 10 days.

(21) Appl. No.: 10/534,706

(22) PCT Filed: Nov. 13, 2003

(86) PCT No.: PCT/JP03/14458

§ 371 (c)(1),
(2), (4) Date: Jun. 8, 2005

(87) PCT Pub. No.: WO2004/044033

PCT Pub. Date: May 27, 2004

(65) Prior Publication Data

US 2005/0250930 A1    Nov. 10, 2005

(30) Foreign Application Priority Data

| Nov. 14, 2002 | (JP) | ............... 2002-330413 |
| Apr. 16, 2003 | (JP) | ............... 2003-111270 |
| Sep. 8, 2003 | (JP) | ............... 2003-315229 |
| Sep. 12, 2003 | (JP) | ............... 2003-321150 |

(51) Int. Cl.
*C08G 64/00*    (2006.01)

(52) U.S. Cl. ............ 528/196; 264/176.1; 264/219; 428/411.1; 525/436; 525/437; 528/198; 528/202; 528/210

(58) Field of Classification Search ............ 264/176.1, 264/219; 428/411.1; 525/436, 437; 528/196, 528/198, 210, 202
See application file for complete search history.

(56) References Cited

FOREIGN PATENT DOCUMENTS

| EP | 0591962 | * | 10/1993 |
| JP | 59-12952 | | 1/1984 |
| JP | 6-25401 | | 2/1994 |
| JP | 06116383 | * | 4/1994 |
| JP | 7-52271 | | 2/1995 |
| JP | 11-35815 | | 2/1999 |
| JP | 11-174424 | | 7/1999 |
| JP | 11-306823 | | 11/1999 |
| JP | 2001-83489 | | 3/2001 |

* cited by examiner

*Primary Examiner*—Terressa Boykin
(74) *Attorney, Agent, or Firm*—Wenderoth, Lind & Ponack, L.L.P.

(57) ABSTRACT

There are provided a polycarbonate copolymer (A) which has excellent light resistance and heat resistance and comprises an aromatic dihydroxy component comprising 5 to 95 mol % of fluorene-skeleton-containing dihydroxy compound (1) having a specific structure and 95 to 5 mol % of ordinary bisphenol type dihydroxy compound (2), the content of fluorene-9-one in the copolymer being not higher than 15 ppm; and a polycarbonate composition comprising 0.01 to 5 parts by weight of ultraviolet absorber (B) based on 100 parts by weight of the copolymer (A), and the composition comprising the copolymer.

26 Claims, No Drawings

US 7,244,804 B2

POLYCARBONATE COPOLYMER, RESIN COMPOSITION, AND MOLDED ARTICLE

TECHNICAL FIELD

The present invention relates to a polycarbonate copolymer, and a resin composition and molded article comprising the copolymer. More specifically, it relates to a polycarbonate copolymer having excellent light resistance and heat resistance, a resin composition comprising the copolymer, and a molded article formed therefrom.

Much more specifically, it relates to a polycarbonate copolymer capable of providing a molded article which is excellent not only in transparency but also in color stability under a high temperature atmosphere and light resistance, a resin composition comprising the copolymer, and use of the composition to a molded article.

BACKGROUND ART

A polycarbonate resin obtained by reacting bisphenol A with a carbonate precursor has heretofore been widely used in many fields as an engineering plastic due to its excellent transparency, heat resistance, mechanical properties and dimensional stability. Due to the excellent transparency in particular, it is used in many applications as an optical material, and its use in such applications requiring heat resistance as light covers, gloves, electronic component materials, LED lenses, prisms, hard disk carriers, films for liquid crystal substrates of liquid crystal displays and retardation films has been considered in recent years. In the case of these applications, the ordinary polycarbonate resin obtained from bisphenol A has a problem. For instance, when it is used in the film for a liquid crystal display, it has a problem of insufficient heat resistance because a high temperature treatment of 180° C. or higher is required in an oriented film formation process, electrode formation process or the like. Further, when the conventional polycarbonate is used in the light cover or glove, it also has a problem in heat resistance due to an increase in heat quantity along with an increase in luminescence intensity of lights in recent years.

To improve the heat resistance of the polycarbonate, a method of using bisphenols having a structure which is bulky and is not easily movable is generally applied, and various polycarbonates have been proposed. Of these, polycarbonates having specific fluorene skeletons have been proposed (for example, JP-A 6-25401 (the term "JP-A" as used herein means an "unexamined published Japanese patent application"), JP-A 7-52271, JP-A 11-174424 and JP-A 11-306823). However, although these polycarbonates having fluorene skeletons are excellent in heat resistance, the initial color of articles molded from the polycarbonates has strong yellowness, so that an improvement in the color is required when they are used in optical applications or outer covering applications.

Further, since the polycarbonates having fluorene skeletons are liable to be degraded and yellowed very easily by irradiation of ultraviolet radiation after molded, applications thereof are limited when applied to optical components or outer covering parts.

Meanwhile, to prevent degradation or yellowing of the ordinary polycarbonate from bisphenol A by ultraviolet radiation, addition of benzotriazole or benzophenone based ultraviolet absorber to the resin (JP-A 11-35815) or addition of benzoxazine-one based ultraviolet absorber to the resin (JP-A 59-12952) has been proposed. Use of these ultraviolet absorbers has an effect of preventing degradation by ultraviolet radiation to some extent on articles molded from the ordinary polycarbonate from bisphenol A, depending on the type and amount of the absorber. However, since the above polycarbonate having a fluorene skeleton has a structure that is easily degraded by ultraviolet radiation in addition to having yellowness in the initial color after molding as described above, selection of the type and amount of an ultraviolet absorber is limited. For example, when an ultraviolet absorber is added to the polycarbonate having a fluorene skeleton in a sufficiently large amount to improve light resistance according to its type, a molded article therefrom may undergo defective moldings or coloration, or the heat resistance of the resin may deteriorate.

DISCLOSURE OF THE INVENTION

Problems to be Solved by the Invention

Therefore, a first object of the present invention is to improve the color in the initial stage of molding of a fluorene-skeleton containing polycarbonate having relatively good heat resistance and birefringence.

A second object of the present invention is to provide a resin and a resin composition which hardly undergo deterioration and yellowing caused by ultraviolet radiation, in an article molded from a polycarbonate having a fluorene skeleton.

A third object of the present invention is to provide a resin and a resin composition which very hardly undergo degradation of physical properties and deterioration in color when exposed to ultraviolet radiation or heat, in an article molded from a polycarbonate having a fluorene skeleton.

Another object of the present invention is to provide a molded article formed from a polycarbonate having a fluorene skeleton and having excellent transparency, birefringence, heat resistance, mechanical properties and dimensional stability, particularly an optical article having these characteristics.

According to studies made by the present inventors, it has been revealed that a specific impurity existing in a dihydric phenol raw material having a fluorene skeleton or produced by a side reaction during a polymerization reaction of the dihydric phenol causes initial color in molding of the polycarbonate having a fluorene skeleton. More specifically, when the content of fluorene-9-one existing as an impurity in the polycarbonate obtained by the polymerization reaction is equal to or higher than a certain content, the initial color after molding is degraded, and it significantly influences deterioration in the physical properties of a molded article and yellowing of the molded article caused by ultraviolet radiation.

Meanwhile, it has been revealed that to control the content of fluorene-9-one in the polycarbonate to lower than the certain content, a dihydric phenol having a low fluorene-9-one content should be used as the dihydric phenol raw material having a fluorene skeleton or a dihydric phenol from which fluorene-9-one has been removed by purification should be used and conditions which do not allow production of fluorene-9-one by by-product of dihydric phenol during polymerization should be used.

Further, according to the studies of the present inventors, it has been found that a polycarbonate whose fluorine-9-one content is lower than the certain content has advantages that a change in the color of an article molded therefrom caused by heat or ultraviolet radiation is small and that production of fluorene-9-one from the fluorene skeleton is further suppressed by addition of an ultraviolet absorber, in addition to an advantage of having excellent initial color after molding. It is assumed that this is because the content of fluorene-9-one in the resin which is lower than the certain content has an effect of suppressing further production of fluorene-9-one from the fluorene skeleton by heat or ultraviolet radiation.

Means for Solving the Problems

The above objects of the present invention have been achieved based on the findings.

That is, according to the present invention, there are provided a polycarbonate copolymer (A) which comprises an aromatic dihydroxy component, the aromatic dihydroxy component comprising 5 to 95 mol % of fluorene-skeleton-containing dihydroxy compound (1) represented by the following general formula [1]:

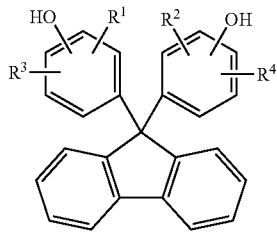

[1]

(wherein $R^1$ to $R^4$ are each independently a hydrogen atom, a hydrocarbon group with 1 to 9 carbon atoms which may contain an aromatic group, or a halogen atom.), and 95 to 5 mol % of dihydroxy compound (2) represented by the following general formula [2]:

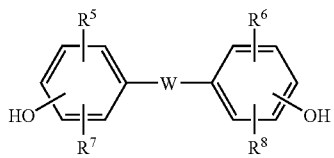

[2]

(wherein $R^5$ to $R^8$ are each independently a hydrogen atom, a hydrocarbon group with 1 to 9 carbon atoms which may contain an aromatic group, or a halogen atom, and W is a single bond, a hydrocarbon group with 1 to 20 carbon atoms which may contain an aromatic group or an O, S, SO, $SO_2$, CO or COO group.), the content of fluorene-9-one in the polycarbonate copolymer being not higher than 15 ppm; and a molded article formed from the copolymer.

According to the present invention, there are also provided a polycarbonate composition comprising 100 parts by weight of the above polycarbonate copolymer (A) having a fluorene-9-one content of not higher than 15 ppm and 0.01 to 5 parts by weight of ultraviolet absorber (B); and a molded article formed from the compositions.

Hereinafter, the polycarbonate copolymer of the present invention, the resin composition comprising the copolymer and the molded articles formed from the copolymer and the composition will be further described.

The aromatic dihydroxy component constituting the polycarbonate copolymer of the present invention comprises 5 to 95 mol %, preferably 10 to 90 mol %, more preferably 15 to 80 mol % of the fluorene-skeleton-containing dihydroxy compound represented by the above formula [1]. When the proportion thereof is lower than 5 mol %, unsatisfactory properties as a heat resistant material which is an object of the present invention result disadvantageously.

The most preferable range of the dihydroxy component represented by the above formula [1] is 30 to 75 mol %.

In the above formula, $R^1$ to $R^4$ are preferably each independently a hydrogen atom or a methyl group. It is particularly preferred that $R^1$ and $R^2$ be a hydrogen atom and $R^3$ and $R^4$ be a methyl group.

Illustrative examples of 9,9-bis(4-hydroxyphenyl)fluorenes include 9,9-bis(4-hydroxyphenyl)fluorene, 9,9-bis(4-hydroxy-3-methylphenyl)fluorene, 9,9-bis(4-hydroxy-3-ethylphenyl)fluorene, and 9,9-bis(4-hydroxy-2-methylphenyl)fluorene. Of these, 9,9-bis(4-hydroxy-3-methylphenyl)fluorene is preferred.

As the dihydroxy component represented by the above general formula [2] and used in the polycarbonate copolymer of the present invention, any dihydroxy compound which is generally used as a dihydroxy component of an aromatic polycarbonate may be used. Illustrative examples thereof include hydroquinone, resorcinol, 4,4'-biphenol, 1,1-bis(4-hydroxyphenyl)ethane, 2,2-bis(4-hydroxyphenyl)propane (bisphenol A), 2,2-bis(4-hydroxy-3-methylphenyl)propane (bisphenol C), 2,2-bis(4-hydroxyphenyl)butane, 1,1-bis(4-hydroxyphenyl)-1-phenylethane, 1,1-bis(4-hydroxyphenyl)cyclohexane (bisphenol Z), 1,1-bis(4-hydroxyphenyl)-3,3,5-trimethylcyclohexane, 2,2-bis(4-hydroxyphenyl)pentane, 4,4'-(p-phenylenediisopropylidene)diphenol, α,α'-bis(4-hydroxyphenyl)-m-diisopropylbenzene (bisphenol M), and 1,1-bis(4-hydroxyphenyl)-4-isopropylcyclohexane. Of these, bisphenol A, bisphenol C, bisphenol Z and bisphenol M are preferred, and bisphenol A is particularly preferred.

The polycarbonate copolymer preferably shows a specific viscosity at 20° C. of 0.2 to 1.2, more preferably 0.25 to 1.0, much more preferably 0.27 to 0.80, when a solution having 0.7 g of the polymer dissolved in 100 ml of methylene chlorine is measured for the specific viscosity. With the specific viscosity within the above range, a molded article or film is sufficiently strong, has adequate melt viscosity and solution viscosity and is easy to handle advantageously.

The polycarbonate copolymer of the present invention is produced by reaction means known per se for producing an ordinary polycarbonate, e.g., a method comprising reacting an aromatic dihydroxy component with a carbonate precursor such as phosgene or a carbonic diester. Next, basic means will be briefly described with respect to the production method.

A reaction using, for example, phosgene as a carbonate precursor is generally carried out in the presence of an acid binding agent and a solvent. As the acid binding agent, an alkali metal hydroxide such as sodium hydroxide or potassium hydroxide or an amine compound such as pyridine is used. As the solvent, a halogenated hydrocarbon such as methylene chloride or chlorobenzene is used. Further, a catalyst such as a tertiary amine or a quaternary ammonium salt can be used to accelerate the reaction. In that case, the reaction temperature is generally 0 to 40° C., and the reaction time is several minutes to 5 hours.

An ester exchange reaction using a carbonic diester as a carbonate precursor is carried out by a method comprising agitating a predetermined amount of an aromatic dihydroxy component together with a carbonic diester under heating in an inert gas atmosphere while distilling out an alcohol or phenol produced. Although the reaction temperature varies according to the boiling point of alcohol or phenol produced and other factors, it generally ranges from 120° C. to 300° C. The reaction is carried out under reduced pressure from the initial stage and completed while distilling out the alcohol or phenol produced.

Further, to accelerate the above reaction, catalysts which are generally used in an ester exchange reaction can be used. Specific examples of the carbonic diester used in the above ester exchange reaction include diphenyl carbonate, dinaphthyl carbonate, bis(diphenyl)carbonate, dimethyl carbonate, diethyl carbonate, and dibutyl carbonate. Of these, diphenyl carbonate is particularly preferred.

In the polymerization reaction of the polycarbonate copolymer of the present invention, monofunctional phenols which are generally used as a terminal blocking agent can be used. Particularly, in the case of a reaction using phosgene as a carbonate precursor, the monofunctional phenol is generally used as a terminal blocking agent to adjust a molecular weight, and an obtained aromatic polycarbonate copolymer having its terminals blocked by groups based on the monofunctional phenol has better thermal stability than its counterpart whose terminals are not blocked by the groups.

The monofunctional phenols may be any monofunctional phenols which are used as a terminal blocking agent for an aromatic polycarbonate resin. They are generally phenols or lower alkyl substituted phenols and can be exemplified by monofunctional phenols represented by the following general formula:

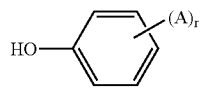

(wherein A represents a hydrogen atom or a linear or branched alkyl or arylalkyl group having 1 to 9 carbon atoms, and r represents an integer of 1 to 5, preferably 1 to 3.)

Specific examples of the above monofunctional phenols include phenol, p-t-butylphenol, p-cumylphenol and isooctylphenol.

Further, other monofunctional phenols such as phenols or benzoic chlorides having a long-chain alkyl group or aliphatic ester group as a substituent, and long-chain alkyl carboxylic chlorides can be used. When the aromatic polycarbonate copolymer is terminal-blocked by use of these monofunctional phenols, they not only serve as a terminal blocking agent or a molecular weight adjuster but also improve the melt flowability of the resin, thereby facilitating molding, and improve its physical properties as well. The above monofunctional phenols are preferably used particularly because they have an effect of reducing the water absorption of the resin. They are represented by the following general formulae [I-a] to [I-h]:

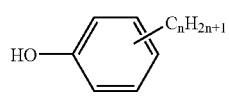

[I-a]

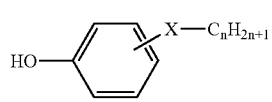

[I-b]

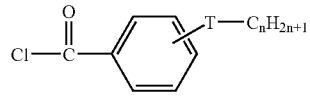

[I-c]

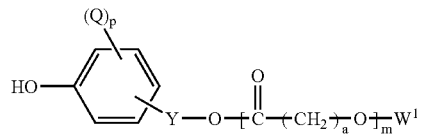

[I-d]

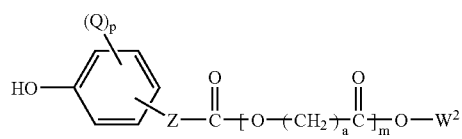

[I-e]

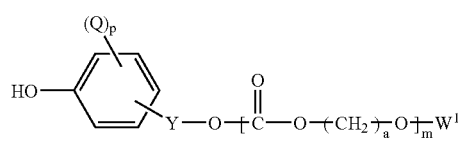

[I-f]

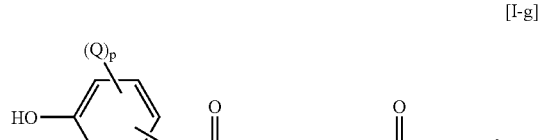

[I-g]

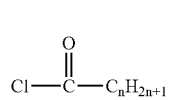

[I-h]

(wherein X represents —R—O—, —R—CO—O— or —R—O—CO— wherein R represents a single bond or a divalent aliphatic hydrocarbon group having 1 to 10 carbon atoms, preferably 1 to 5 carbon atoms;

T represents a single bond or one of the same bonds as those represented by the above X;

n represents an integer of 10 to 50;

Q represents a halogen atom or a monovalent aliphatic hydrocarbon group having 1 to 10 carbon atoms, preferably 1 to 5 carbon atoms;

p represents an integer of 0 to 4;

Y represents a divalent aliphatic hydrocarbon group having 1 to 10 carbon atoms, preferably 1 to 5 carbon atoms;

$W^1$ represents a hydrogen atom, —CO—$R^{17}$, —CO—O—$R^{18}$ or $R^{19}$ wherein $R^{17}$, $R^{18}$ and $R^{19}$ each independently represent a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms, or a monovalent aromatic hydrocarbon group having 6 to 15 carbon atoms, preferably 6 to 12 carbon atoms;

a represents an integer of 4 to 20, preferably 5 to 10;

m represents an integer of 1 to 100, preferably 3 to 60, particularly preferably 4 to 50;

Z represents a single bond or a divalent aliphatic hydrocarbon group having 1 to 10 carbon atoms, preferably 1 to 5 carbon atoms; and, $W^2$ represents a hydrogen atom, a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms, or a monovalent aromatic hydrocarbon group having 6 to 15 carbon atoms, preferably 6 to 12 carbon atoms.)

Of these, substituted phenols of [I-a] and [I-b] are preferred. As the substituted phenols of [I-a], compounds having an n of 10 to 30 are preferred, and compounds having an n of 10 to 26 are particularly preferred. Specific examples thereof include decylphenol, dodecylphenol, tetradecylphenol, hexadecylphenol, octadecylphenol, eicosylphenol, docosylphenol and triacontylphenol.

Further, as the substituted phenols of [I-b], compounds in which X is —R—CO—O— and R is a single bond are appropriate. Compounds having an n of 10 to 30 are suitable, and compounds having an n of 10 to 26 are particularly suitable. Specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

In the substituted phenols or substituted benzoic chlorides represented by the above general formulae [I-a] to [I-g], the positions of substituents are generally preferably a para position or an ortho position, and a mixture of the two is preferred.

The above monofunctional phenols are desirably introduced to at least 5 mol %, preferably at least 10 mol % of all terminals of the obtained polycarbonate copolymer. Further, the monofunctional phenols may be used alone or in admixture of two or more.

Further, when 9,9-bis(4-hydroxyphenyl)fluorenes constitute 60 mol % or more of all aromatic hydroxy components in the polycarbonate copolymer of the present invention, the flowability of the resin may deteriorate. Accordingly, the substituted phenols or substituted benzoic chlorides represented by the above general formulae [I-a] to [I-g] are preferably used as a terminal blocking agent.

The polycarbonate copolymer of the present invention may be a polyester carbonate copolymerized with an aromatic dicarboxylic acid such as terephthalic acid, isophthalic acid, naphthalenedicarboxylic acid or a derivative thereof in such an amount that does not impair the effect of the present invention. Further, it may also be a branched polycarbonate copolymerized with a small amount of a trifunctional compound.

The polycarbonate copolymer of the present invention preferably has a glass transition point of 150° C. or higher, more preferably 160° C. or higher, much more preferably 165 to 210° C.

The polycarbonate copolymer of the present invention preferably has a fluorene-9-one content of not higher than 15 ppm, more preferably not higher than 5 ppm. When the content of fluorene-9-one is higher than 15 ppm, a desired aromatic polycarbonate copolymer which has excellent color and a very small b value is not obtained disadvantageously. Further, fluorene-9-one can induce deterioration of color when the aromatic polycarbonate copolymer is in a solution state or molten state. From this viewpoint as well, the content of fluorene-9-one should not exceed 15 ppm.

As described above, the aromatic polycarbonate copolymer of the present invention is produced by reaction means known per se for producing an ordinary aromatic polycarbonate resin, e.g., a method comprising reacting an aromatic dihydroxy component with a carbonate precursor such as phosgene or a carbonic diester. However, to obtain the polycarbonate copolymer of the present invention having a fluorene-9-one content of not higher than 15 ppm, various methods and means are desirably employed as described below.

Fluorene-9-one as an impurity in the polycarbonate copolymer is a compound represented by the following chemical formula.

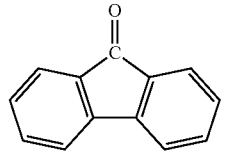

This fluorene-9-one is an impurity which is mixed in or produced from the above fluorene-skeleton-containing dihydroxy compound [I] which is a raw material for obtaining the polycarbonate copolymer. That is, fluorene-9-one is a compound which is contained as an impurity in the dihydroxy compound [I] as a raw material or by-produced from the compound [I] during polymerization.

Thus, as the dihydroxy compound [I] as a raw material, one having as low a fluorene-9-one content as possible should be used. The upper limit of the content depends on the copolymerization rate and polymerization conditions of the dihydroxy compound [I]. In general, a dihydroxy compound [I] having a fluorene-9-one content of not higher than 20 ppm, preferably not higher than 10 ppm, particularly preferably not higher than 5 ppm should be used as a raw material.

Although a lower content of fluorene-9-one is more preferred, it cannot be prevented that a small amount of the compound enters the polycarbonate copolymer from the raw material of the copolymer or from by-production at the time of hot molding. Therefore, a content of about 0.1 ppm or higher cannot be avoided.

It has been revealed that fluorene-9-one not only enters the polycarbonate copolymer from the raw material but also is produced from the dihydroxy compound [I] by a side reaction during polymerization as well. Thus, for production of the polycarbonate copolymer, conditions which minimize by-production of fluorene-9-one from the raw material dihydroxy compound [I] are desirably selected.

According to studies made by the present inventors, it has been found that production of fluorene-9-one during polymerization can be suppressed by (1) a method of limiting a time spanning from dissolving the dihydroxy compound in an acid binding agent and a solvent completely to the start of its reaction with the carbonate precursor to within a given time and (2) a method of carrying out the reaction between the dihydroxy compound and the carbonate precursor and the polymerization reaction substantially in the absence of molecular oxygen. Although only either one of these methods may be employed, the effect becomes further remarkable when these methods are used in combination. Hereinafter, these methods will be further described.

A reaction using, for example, phosgene as the carbonate precursor is generally carried out in the presence of an acid binding agent and a solvent. As the acid binding agent, an alkali metal hydroxide such as sodium hydroxide or potassium hydroxide or an amine compound such as pyridine is used. As the solvent, a halogenated hydrocarbon such as methylene chloride or chlorobenzene is used. Further, a catalyst such as a tertiary amine or a quaternary ammonium salt can be used to accelerate the reaction. In that case, the reaction temperature is generally 0 to 40° C., and the reaction time is several minutes to 5 hours.

In the reaction, a time spanning from dissolving the aromatic dihydroxy compound in the acid binding agent and solvent completely to the start of its reaction with the carbonate precursor is preferably within one hour, more preferably within 30 minutes. When the time to the start of the reaction exceeds one hour, the fluorene-skeleton-containing dihydroxy compound [I] is partially decomposed and fluorene-9-one is therefore by-produced, so that the aromatic polycarbonate copolymer of the present invention having a low content of fluorene-9-one may not be obtained.

If the above time to the start of the reaction is within one hour, an aromatic dihydroxy compound having a fluorene-9-one content of not higher than 10 ppm, preferably not higher than 5 ppm, can be used.

Meanwhile, when the content of fluorene-9-one in the aromatic dihydroxy compound is 15 to 25 ppm, the above time to the start of the reaction is desirably within 5 minutes.

Another method for suppressing by-production of fluorene-9-one is a method of carrying out the polymerization reaction substantially in the absence of molecular oxygen. "Substantially in the absence of molecular oxygen" means that molecular oxygen is not allowed to exist in the gas phase and liquid phase in the polymerization reaction system and the oxygen concentration of the gas phase and liquid phase is not higher than 0.5 ppm, preferably not higher than 0.2 ppm, more preferably not higher than 0.1 ppm, for example.

To prevent molecular oxygen from existing in the polymerization reaction, there is employed a method of blowing a nitrogen gas into the polymerization reaction system or a method of adding a reducing agent such as hydrosulfite. A method of sealing it in a reaction container with a nitrogen gas is also effective in preventing molecular oxygen from entering. Further, it is also effective in suppressing by-production of fluorene-9-one to carry out a purification step subsequent to completion of the polymerization reaction in a nitrogen gas atmosphere.

As described above, it is known that the polycarbonate having a fluorene skeleton has improved heat resistance and rigidity. However, this polycarbonate is apt to be colored by the polymerization reaction as well as molding, and the color of the resulting molded article has a tinge of yellow. Accordingly, the molded article of the polycarbonate having a fluorene skeleton has been strongly desired to have its color improved for its optical applications.

The above polycarbonate copolymer of the present invention has a very low content of fluorene-9-one as an impurity and improved color. That is, a molded article formed from the polycarbonate copolymer of the present invention has very pale yellow, i.e., a very small b value which will be described later. Thus, an increase in the utility value of optical applications is expected.

Thus, according to the present invention, there is provided a polycarbonate copolymer showing a b value of 5.0 or less when a solution prepared by dissolving 5 g of the polycarbonate copolymer having a fluorene skeleton in 50 ml of methylene chloride in a light blocking condition is measured at an optical path length of 30 mm.

The b value of the polycarbonate copolymer is a measure of yellowness in color. As the value becomes smaller, yellow becomes paler. The polycarbonate copolymer of the present invention has a b value of 5.0 or less, preferably 4.5 or less, most preferably 3.5 or less. Although this b value can be achieved by a content of fluorene-9-one in the polycarbonate copolymer of not higher than 15 ppm, (a) the content of sulfur or a sulfur compound as an impurity in the copolymer are equal to or lower than a certain content. Alternatively, when (b) a chlorine content based on terminal chloroformate groups of the copolymer and a terminal hydroxyl group (OH) content are equal to or lower than certain contents, the b value of the polycarbonate copolymer molded article can be made further smaller.

Thus, according to the present invention, there are provided the following polycarbonate copolymers (a) and (b):
(a) a fluorene-skeleton-containing polycarbonate copolymer having a sulfur or sulfur compound content of not higher than 50 ppm in terms of sulfur atom, and
(b) a fluorene-skeleton-containing polycarbonate copolymer having a chlorine content based on terminal chloroformate groups of the copolymer of not higher than 10 ppm and a terminal hydroxyl group (OH) content of not higher than 250 ppm.

Only either one of the above conditions (a) and (b) may be satisfied. However, when both of the above conditions (a) and (b) are satisfied, the b value of the polycarbonate copolymer molded article becomes further smaller. Further, when the condition (a) or (b) is satisfied, the copolymer has better heat resistance and rigidity.

To reduce the content of sulfur or a sulfur compound as an impurity in the above condition (a), it is necessary to implement means for preventing mixing or elution of sulfur or the sulfur compound in the production process. For example, when phosgene is produced by using a coke as a raw material, a sulfur component in the coke enters phosgene; thus, it is necessary to use a coke having a low sulfur content or remove a sulfur component produced by subjecting produced carbon monoxide to an alkaline treatment. Further, when a sulfur-based reducing agent such as hydrosulfite is used to prevent coloration of alkaline aqueous solution of bisphenol, its amount used must be reduced to a minimum required amount. However, in the case of the copolymer of the present invention, the above sulfur-based reducing agent must be added in an excessive amount so as to prevent the coloration; thus, it is necessary to remove the excessive agent by rinsing with water after oxidizing it to a water-soluble compound. Further, it is also necessary to use, as other raw materials used in production of the polycarbonate copolymer, washing water and materials of packing and the like, those having a low sulfur content and a low possibility of elution of sulfur.

The sulfur compound content of phosgene used in production of the polycarbonate copolymer is preferably not higher than 5 ppm. The sulfur compound content is more preferably not higher than 1 ppm, much more preferably not higher than 0.5 ppm, most preferably not higher than 0.05 ppm.

The sulfur compound content of carbon monoxide used in production of the above phosgene is not higher than 10 ppm, preferably not higher than 5 ppm, more preferably not higher than 0.5 ppm.

Carbon monoxide having a sulfur compound content of not higher than 10 ppm is obtained by, e.g., a method comprising bringing carbon monoxide obtained by reacting a coke with oxygen into contact with active carbon or active alumina impregnated with a metal oxide and/or metal salt as of Cu, Cr, V, Mo or the like and then bringing the resulting carbon monoxide into contact with a caustic soda aqueous solution or a method comprising bringing the carbon monoxide into contact with a caustic soda aqueous solution and then bringing the resulting carbon monoxide into contact with active alumina.

A polycarbonate copolymer which satisfies the above condition (b) has a chlorine content based on terminal chloroformate groups of the polymer of not higher than 10 ppm and a content of terminal hydroxyl groups of the polymer of not higher than 250 ppm. The chlorine content based on terminal chloroformate groups of the polymer is preferably not higher than 5 ppm, more preferably not higher than 2 ppm. Further, the content of terminal hydroxyl groups of the polymer is preferably not higher than 200 ppm, more preferably not higher than 100 ppm. When the chlorine content based on terminal chloroformate groups of the polymer exceeds 10 ppm and the content of terminal hydroxyl groups of the polymer exceeds 250 ppm, the color of the polycarbonate copolymer is degraded, metals are corroded and deterioration of the polycarbonate copolymer is promoted disadvantageously.

As described above, the polycarbonate copolymer (A) of the present invention having a fluorene-9-one content of not higher than 15 ppm forms a mold article which shows excellent color immediately after molding and hardly undergoes deterioration or yellowing caused by ultraviolet radiation.

According to studies made by the present inventors, it has been revealed that in a molded article formed from a composition prepared by adding the ultraviolet absorber (B) to the polycarbonate copolymer (A), production of fluorene-9-one from the fluorene structure in the polycarbonate copolymer (A) is suppressed, and deterioration or yellowing of the molded article is further suppressed.

Thus, according to the present invention, there are provided a polycarbonate composition comprising 100 parts by weight of the polycarbonate copolymer (A) having a fluorene-9-one content of not higher than 15 ppm and 0.001 to 5 parts by weight of the ultraviolet absorber (B) and a molded article formed from the composition.

The above ultraviolet absorber to be added to the polycarbonate composition is preferably an ultraviolet absorber which is uniformly dispersible in the polycarbonate resin and is stable under molding conditions. Particularly, it is preferably one contained in a polycarbonate as an ultraviolet absorber.

As the ultraviolet absorber used in the present invention, a benzotriazole based ultraviolet absorber, a triazine based ultraviolet absorber, a benzoxazine based ultraviolet absorber or a benzophenone based ultraviolet absorber is used.

Illustrative examples of the benzotriazole based ultraviolet absorber include 2-(2'-hydroxy-5'-methylphenyl)benzotriazole, 2-(2'-hydroxy-3'-(3",4",5",6"-tetrahydrophthalimidemethyl)-5'-methylphenyl)benzotriazole, 2-(2'-hydroxy-3', 5'-di-t-butylphenyl)benzotriazole, 2-(2'-hydroxy-5'-t-octylphenyl)benzotriazole, 2-(3'-t-butyl-5'-methyl-2'-hydroxyphenyl)-5-chlorobenzotriazole, 2,2'-methylenebis(4-(1,1,3,3-tetramethylbutyl)-6-(2H-benzotriazole-2-yl) phenol), 2-(2'-hydroxy-3',5'-bis(α,α-dimethylbenzyl) phenyl)-2H-benzotriazole, 2-(3',5'-di-t-amyl-2'-hydroxyphenyl)benzotriazole, 5-trifluoromethyl-2-(2-hydroxy-3-(4-methoxy-α-cumyl)-5-t-butylphenyl)-2H-benzotriazole, 3-phenyl-7-(4'-methyl-5'-n-butyl-2H-benzotriazole-2-yl) coumarin, and 3-phenyl-7-(2H-naphtho[1,2-d]-triazole-2-yl) coumarin.

Of these, 2-(2'-hydroxy-3'-(3",4",5",6"-tetrahydrophthalimidemethyl)-5'-methylphenyl)benzotriazole, 2-(2'-hydroxy-3',5'-di-t-butylphenyl)benzotriazole, 2-(3'-t-butyl-5'-methyl-2'-hydroxyphenyl)-5-chlorobenzotriazole, and 2,2'-methylenebis(4-(1,1,3,3-tetramethylbutyl)-6-(2H-benzotriazole-2-yl)phenol) are preferred, and 2,2'-methylenebis(4-(1,1,3,3-tetramethylbutyl)-6-(2H-benzotriazole-2-yl)phenol) is more preferred.

As the triazine based ultraviolet absorber, 2-(4,6-diphenyl-1,3,5-triazine-2-yl)-5-[(hexyl)oxy]phenol and 7-{[4-methoxy-6-(diethylamino)-S-triazine-2-yl]-amino}-3-phenylcoumarin are preferred.

Illustrative examples of the benzoxazine based ultraviolet absorber include 2-methyl-3,1-benzoxazine-4-one, 2-butyl-3,1-benzoxazine-4-one, 2-phenyl-3,1-benzoxazine-4-one, 2-(1- or 2-naphthyl)-3,1-benzoxazine-4-one, 2-(4-biphenyl)-3,1-benzoxazine-4-one, 2,2'-bis(3,1-benzoxazine-4-one), 2,2'-p-phenylenebis(3,1-benzoxazine-4-one), 2,2'-m-phenylenebis(3,1-benzoxazine-4-one), 2,2'-(4,4'-diphenylene)bis(3,1-benzoxazine-4-one), 2,2'-(2,6 or 1,5-naphthalene)bis(3,1-benzoxazine-4-one) and 1,3,5-tris(3,1-benzoxazine-4-one-2-yl)benzene. Of these, 2,2'-p-phenylenebis(3,1-benzoxazine-4-one) and 2,2'-(4,4'-diphenylene)bis(3,1-benzoxazine-4-one) are preferred.

Illustrative examples of the benzophenone based ultraviolet absorber include 2-hydroxy-4-methoxybenzophenone, 2-hydroxy-4-n-octoxybenzophenone, 2-hydroxy-4-methoxy-2'-carboxybenzophenone, 2,4-dihydroxybenzophenone and 2,2'-dihydroxy-4-methoxybenzophenone. Of these, 2-hydroxy-4-n-octoxybenzophenone is preferred. These ultraviolet absorbers may be used alone or in combination of two or more.

The ultraviolet absorber (B) contained in the polycarbonate composition of the present invention is particularly suitably an ultraviolet absorber showing an absorbance at 360 nm ($A_{360\ nm}$) measured at an optical path length of 1 cm of not lower than 0.5 (preferably not lower than 0.6) when dissolved in methylene chloride at a concentration of 10 mg/L and an absorbance at 400 nm ($A_{400\ nm}$) measured at an optical path length of 1 cm of not higher than 0.01 when dissolved in methylene chloride at a concentration of 10 mg/L.

Of the above ultraviolet absorbers (B), the benzoxazine based ultraviolet absorber is suitable. In particular, a benzoxazine based ultraviolet absorber represented by the following general formula [3]:

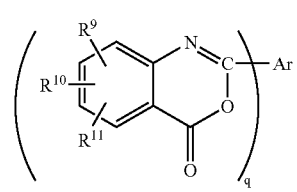

[3]

(wherein $R^9$ to $R^{11}$ each independently represent a hydrogen atom, a hydrocarbon group with 1 to 9 carbon atoms which may contain an aromatic hydrocarbon group or a halogen atom, Ar represents a q-valent aromatic hydrocarbon group having 6 to 15 carbon atoms, and q represents an integer of 1, 2 or 3.) is preferred.

Further, when the ultraviolet absorber (B) is added to the polycarbonate copolymer, it may lower the glass transition temperature of the copolymer. Thus, the ultraviolet absorber (B) is desirably an ultraviolet absorber which does not significantly lower the glass transition temperature of the copolymer. That is, when the glass transition temperature of an aromatic polycarbonate resin composition containing 2 parts by weight of the ultraviolet absorber (B) based on 100 parts by weight of the polycarbonate copolymer (A) is Tg' and the glass transition temperature of an aromatic polycarbonate resin containing no ultraviolet absorber is Tg, Tg−Tg'≦5° C. preferably holds. An ultraviolet absorber which has a low molecular weight or is in a liquid form significantly lowers Tg and severely impairs heat resistance disadvantageously.

The ultraviolet absorber (B) is contained in an amount of 0.01 to 5.0 parts by weight, preferably 0.02 to 3.0 parts by weight, more preferably 0.05 to 2.5 parts by weight, based on 100 parts by weight of the polycarbonate copolymer (A).

The polycarbonate copolymer and polycarbonate composition of the present invention may contain various additives used for improving the physical properties or moldability of a molded article of a polycarbonate. Illustrative examples of the additives include a thermal stabilizer, an oxidation stabilizer, a mold releasing agent, a bluing agent, a colorant, an antistatic agent, a lubricant, a light diffusing agent and a filler. Further, other polycarbonates and thermoplastic resins may also be contained in such a small amount that does not impair the object of the present invention. Of these additives, specific examples of the thermal stabilizer, antioxidant, mold releasing agent and bluing agent will be described hereinafter.

(1) Thermal Stabilizer

In the present invention, as a thermal stabilizer, at least one phosphorus compound selected from the group consisting of phosphoric acid, phosphorous acid, phosphonic acid, phosphonous acid and esters thereof may be contained in the polycarbonate copolymer in an amount of 0.0001 to 0.05% by weight. By addition of the phosphorus compound, the thermal stability of the polycarbonate copolymer is improved, and a decrease in molecular weight and deterioration of color at the time of molding are prevented.

The phosphorus compound is at least one phosphorus compound selected from the group consisting of phosphoric acid, phosphorous acid, phosphonic acid, phosphonous acid and esters thereof. Preferably, it is at least one phosphorus compound selected from the group consisting of the following general formulae [4] to [7]:

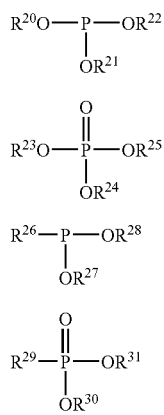

In the above formulae, $R^{20}$ to $R^{31}$ each independently represent a hydrogen atom, an alkyl group having 1 to 20 carbon atoms such as methyl, ethyl, propyl, isopropyl, butyl, isobutyl, t-butyl, pentyl, hexyl, heptyl, octyl, nonyl, decyl, dodecyl, hexadecyl or octadecyl, an aryl group having 6 to 15 carbon atoms such as phenyl, tolyl or naphthyl, or an aralkyl group having 7 to 18 carbon atoms such as benzyl or phenethyl. Further, when two alkyl groups exist in one compound, the two alkyl groups may be bonded to each other to form a ring.

Specific examples of the phosphorus compound represented by the above formula [4] include triphenyl phosphate, trisnonylphenyl phosphite, tris(2,4-di-t-butylphenyl)phosphite, tridecyl phosphite, trioctyl phosphate, trioctadecyl phosphate, didecyl monophenyl phosphate, dioctyl monophenyl phosphate, diisopropyl monophenyl phosphate, monobutyl diphenyl phosphate, monodecyl diphenyl phosphate, monooctyl diphenyl phosphate, bis(2,6-di-t-butyl-4-methylphenyl)pentaerythritol diphosphite, 2,2-methylenebis (4,6-di-t-butylphenyl)octyl phosphate, bis(nonylphenyl) pentaerythritol diphosphite, bis(2,4-di-t-butylphenyl) pentaerythritol diphosphite, bis(2,4-dicumylphenyl) pentaerythritol diphosphite, and distearyl pentaerythritol diphosphite. Specific examples of the phosphorus compound represented by the above formula [5] include tributyl phosphate, trimethyl phosphate, triphenyl phosphate, triethyl phosphate, diphenyl monoorthoxenyl phosphate, dibutyl phosphate, dioctyl phosphate, and diisopropyl phosphate. Specific examples of the phosphorus compound represented by the above formula [6] include tetrakis(2,4-di-t-butylphenyl)-4,4-diphenylene phosphonite. Specific examples of the phosphorus compound represented by the above formula [7] include dimethyl benzene phosphonate, diethyl benzene phosphonate and dipropyl benzene phosphonate. Of these, distearyl pentaerythritol diphosphite, triethyl phosphate, dimethyl benzene phosphonate and bis(2,4-dicumylphenyl) pentaerythritol diphosphite are preferably used.

The amount of the phosphorus compound is 0.0001 to 0.05 wt %, preferably 0.0005 to 0.02 wt %, particularly preferably 0.001 to 0.01 wt %, based on the polycarbonate copolymer.

Further, in addition to the above phosphorus compounds, benzofuranone based compounds can also be used as a thermal stabilizer. Specific examples of the benzofuranone based compounds include 5,7-di-t-butyl-3-(3,4-dimethylphenyl)-3H-benzofurano-2-one and 5,7-di-t-butyl-3-(2,3-dimethylphenyl)-3H-benzofurano-2-one. These compounds may be used alone or in combination of two or more.

The amount of these compounds is 0.0001 to 5 wt %, preferably 0.001 to 0.1 wt %, particularly preferably 0.005 to 0.05 wt %, based on the polycarbonate copolymer.

(2) Antioxidant

To the polycarbonate copolymer of the present invention can be added a commonly known antioxidant for preventing oxidation. An example of the antioxidant is a phenol based antioxidant. Specific examples thereof include triethylene glycol-bis[3-(3-t-butyl-5-methyl-4-hydroxyphenyl) propionate], 1,6-hexanediol-bis[3-(3,5-di-t-butyl-4-hydroxyphenyl) propionate], pentaerythritol-tetrakis[3-(3,5-di-t-butyl-4-hydroxyphenyl) propionate], octadecyl-3-(3,5-di-t-butyl-4-hydroxyphenyl)propionate, 1,3,5-trimethyl-2,4,6-tris(3,5-di-t-butyl-4-hydroxybenzyl) benzene, N,N-hexamethylenebis(3,5-di-t-butyl-4-hydroxy-hydrocinnamide), 3,5-di-t-butyl-4-hydroxy-benzylphosphonate-diethyl ester, tris(3,5-di-t-butyl-4-hydroxybenzyl)isocyanurate, and 3,9-bis{1,1-dimethyl-2-[β-(3-t-butyl-4-hydroxy-5-methylphenyl)propionyloxy] ethyl}-2,4,8,10-tetraoxaspiro (5,5)undecane. A preferred amount of these antioxidants is 0.0001 to 0.05 wt % based on the polycarbonate copolymer.

(2) Mold Releasing Agent

Further, to the aromatic polycarbonate copolymer of the present invention, a higher fatty acid ester of a monohydric or polyhydric alcohol can be added as a mold releasing agent as required.

The higher fatty acid ester is preferably a partial or full ester of a monohydric or polyhydric alcohol having 1 to 20 carbon atoms and a saturated fatty acid having 10 to 30 carbon atoms. Specific examples of the partial or full ester of the monohydric or polyhydric alcohol and the saturated fatty acid include monoglyceride stearate, monosorbitate stearate, monoglyceride behenate, pentaerythritol monostearate, pentaerythritol tetrastearate, propylene glycol monostearate, stearyl stearate, palmityl palmitate, butyl stearate, methyl laurate, isopropyl palmitate, and 2-ethylhexyl stearate. Of these, monoglyceride stearate and pentaerythritol tetrastearate are preferably used.

The amount of the ester of the alcohol and the saturated higher fatty acid is preferably 0.01 to 2 wt %, more preferably 0.015 to 0.5 wt %, much more preferably 0.02 to 0.2 wt %, based on the aromatic polycarbonate copolymer. When the amount is within this range, the copolymer shows excellent releasability, and the mold releasing agent does not migrate and does not adhere to the surface of metal advantageously.

(4) Bluing Agent

The polycarbonate copolymer of the present invention may contain a bluing agent. Illustrative examples of the bluing agent include MACROLEX VIOLET of Bayer AG, DIARESIN VIOLET and DIARESIN BLUE of Mitsubishi Chemical Corporation, and TERASOL BLUE of Sand AG. The most suitable is MACROLEX VIOLET. These bluing agents are contained in the polycarbonate copolymer at a concentration of preferably 0.1 to 3 ppm, more preferably 0.3 to 2.5 ppm, most preferably 0.5 to 2.2 ppm.

A composition prepared by adding an ultraviolet absorber to the polycarbonate copolymer (A) of the present invention can exhibit an effect of suppressing by-product of fluorene-9-one in the polycarbonate copolymer (A), and a molded article formed from the composition has high resistance to thermal degradation and yellowing.

Thus, the effect of the ultraviolet absorber (B) is prominently achieved when the ultraviolet absorber (B) is contained uniformly in the polycarbonate copolymer. However, it has been found that the effect of the ultraviolet absorber (B) is still attained even when it is coated on the surface of a molded article of the polycarbonate copolymer as a surface layer.

Thus, according to the present invention, there is also provided a molded article (referred to as a coated molded article) obtained by coating the surface of a molded article of the polycarbonate copolymer (A) containing 15 ppm or less of fluorene-9-one with a polymer layer containing the ultraviolet absorber (B).

The thickness of the polymer layer of the coated molded article is 1.0 to 50 μm, preferably 2.0 to 20 μm.

The polymer layer which forms the coating layer may contain the ultraviolet absorber (B) in an amount of 0.5 to 40 parts by weight, preferably 1 to 35 parts by weight, particularly preferably 5 to 30 parts by weight, based on 100 parts by weight of the polymer. Illustrative examples of a method for coating the surface of the molded article with the polymer layer include a method of immersing the molded article in a solution comprising the polymer and the ultraviolet absorber and a method of coating the surface of the molded article with the solution. The polymer layer to be coated is preferably transparent. Therefore, a transparent polymer is used. Illustrative examples of the polymer include an acrylic copolymer, a polyolefin and a polyester. Further, a solvent for preparing the polymer solution may be any solvent capable of dissolving the polymer. For example, an alcohol, a ketone, an aromatic hydrocarbon or an aliphatic hydrocarbon is used.

As a method for obtaining a molded article from the polycarbonate copolymer (A) of the present invention and the composition comprising the copolymer, injection molding, compression molding, injection compression molding, extrusion molding, blow molding or the like is used. As a method for producing a film or a sheet, a method of producing a film or sheet having an excellent uniform thickness and free from optical defects is preferred. Illustrative examples of such a method include solvent casting, melt extrusion and calendering.

The composition of the polycarbonate copolymer of the present invention satisfies that when an amount of change in Yellow Index (YI) after a 2-mm-thick molded plate formed from a polycarbonate copolymer (A) containing no ultraviolet absorber (B) is exposed to a mercury lamp of 300 to 400 nm with an exposure intensity of 15 mW/cm² for 7 days is $\Delta YI_0$, a change in Yellow Index after a 2-mm-thick molded plate formed from a polycarbonate copolymer composition comprising a predetermined amount of the ultraviolet absorber (B) used in the present invention is exposed to a mercury lamp of 300 to 400 nm with an exposure intensity of 15 mW/cm² for 7 days is $\Delta YI_1$, and the degree ($R_{YI}$) of light resistance improving effect by the ultraviolet absorber is expressed as $R_{YI}=(1-\Delta YI_1/\Delta YI_0)\times 100$ (%), $R_{YI}\geq 50\%$ holds. The effect of the ultraviolet absorber in the composition of the present invention is significant, and the composition of the polycarbonate copolymer shows good light resistance.

Molded articles produced by these methods are used for various applications requiring heat resistance, such as gradings, automobile lamp lenses, lamp covers, optical lenses, prisms, OHP sheets, name plates, indicating lamps, light guides, optical waveguides and diffusers. Further, films produced by these methods are suitably used as placer boards intended for flat panel display boards or retardation films. When the film is used as the placer board, it is used in an unstretched condition. When the film is used as the retardation film, it is stretched and oriented at least monoaxially to have optimum birefringence properties.

EXAMPLES

Hereinafter, the present invention will be further described with reference to Examples. However, the present invention is by no means limited to the Examples. In the Examples, "parts" refers to "parts by weight". Evaluations were made in accordance with the following methods.

Evaluation Items (1) Content of Fluorene-9-one in Polymer:

50 mg of sample was dissolved in 5 ml of chloroform solvent, and the content of fluorene-9-one in polymer was determined in the chloroform solvent by a GPC analysis at a wavelength of 254 nm by use of TSK-GEL G2000H and G3000H columns of Tosoh Corporation. More specifically, a GPC measurement was made on the sample to which a predetermined amount of fluorene-9-one had been added in advance, a correlation equation for the peak area proportion and the content was prepared, and the equation was defined as a calibration curve. The correlation equation is represented by the following equation.

Fluorene-9-one content (ppm)=Peak Area Proportion (%)×302.7

(2) Content of Fluorene-9-one in Monomer:

10 mg of sample was dissolved in 10 ml of acetonitrile, and the content of fluorene-9-one in monomer was determined in a solvent of acetonitrile/water in a ratio of 6/4 by an HPLC analysis at a wavelength of 254 nm by use of TSK-GEL ODS-80 TM column of Tosoh Corporation.

(3) Intrinsic Viscosity:

A polymer was dissolved in methylene chloride, and intrinsic viscosity was measured at 20° C.

(4) b Value of Film:

A 200-μm-thick film obtained by casting a polymer solution on a glass plate was measured by use of U-3000 spectrophotometer of Hitachi, Ltd. in accordance with a transmission method.

(5) Specific Viscosity:

0.7 g of polymer was dissolved in 100 ml of methylene chloride, and specific viscosity was measured at 20° C.

(6) Glass Transition Point (Tg):

This was measured by use of 2910 DSC of TA Instruments Japan Co., Ltd. under a nitrogen current of 40 ml/min at a temperature increasing rate of 20° C./min.

(7) Color of Sample Plate:

The yellowness (YI) of molded sample plate having a thickness of 2 mm was measured by use of spectrocolorimeter SE-2000 (light source: C/2) of Nippon Denshoku Industries Co., Ltd. in accordance with a transmission method.

(8) Light Resistance:

Without changing the irradiated surface of a molded sample plate having a thickness of 2 mm, the sample plate was irradiated with ultraviolet radiation by using a 400-W transparent mercury lamp of 300 to 400 nm with an ultraviolet irradiation intensity of 15 mW/cm$^2$ as a light source at a test temperature of 80° C. for 7 days. The test sample was recovered, and a change in yellowness (YI) between before and after the test was evaluated by use of spectrocolorimeter SE-2000 (light source: C/2) of Nippon Denshoku Industries Co., Ltd. in accordance with a transmission method.

The result of the test using a sample plate molded from an aromatic polycarbonate resin containing no ultraviolet absorber was $\Delta YI_0$, the result of the test using a sample plate molded from an aromatic polycarbonate resin composition containing a specified amount of an ultraviolet absorber was $\Delta YI_1$, and the degree ($R_{YI}$) of light resistance improving effect was expressed as $R_{YI}=(1-\Delta YI_1/\Delta YI_0)\times 100$ (%).

(9) Sulfur Content:

A full elementary analysis was made by use of an X-ray fluorescent analyzer of Rigaku Corporation. The sulfur content was determined in terms of the X-ray intensity of a sulfur atom.

(10) Viscosity Average Molecular Weight (Mv):

0.7 g of polycarbonate resin was dissolved in 100 ml of methylene chloride, and specific viscosity ($\eta_{sp}$) was measured at 20° C. The specific viscosity was substituted into the following equation so as to determine the viscosity average molecular weight in terms of the intrinsic viscosity of polycarbonate resin obtained from bisphenol A.

$$\eta_{sp}/c=[\eta]+0.45\times[\eta]^2 c$$

$$[\eta]=1.23\times 10^{-4} M^{0.83}$$

(wherein [η] is intrinsic viscosity, and c=0.7)

(11) b Value of Molded Piece:

20 molded pieces were measured by use of colorimeter SE-2000 (light source: C/2) of Nippon Denshoku Industries Co., Ltd. in accordance with a transmission method. The average of the measured values of the 20 pieces was taken as the b value of the molded piece.

(12) Odor:

An odor was evaluated in accordance with a sensory test. Those from which a sulfur odor was sensed during an extrusion or molding process was rated as "Yes", and those from which a sulfur odor was not sensed was rated as "No".

(13) Residual Quantity of Hydrosulfite:

An ultraviolet spectrum was measured by use of a spectrophotometer of Hitachi, Ltd., and the residual quantity of hydrosulfite was determined in terms of absorbance at 315 nm.

(14) Monomer Purity:

An HPLC analysis was conducted in accordance with a gradient program at 40° C. and 280 nm by use of eluent acetonitrile/a mixed solution of 0.2% acetate water and acetonitrile in a Develosil ODS-MG column of Nomura Chemical Co., Ltd. The measurement was made by injecting 10 μl of solution prepared by dissolving 3 mg of sample in 10 ml of acetonitrile, and the proportion of the peak area of the main component based on the total peak area was expressed in %.

(15) Analysis of Trace Chlorine Content:

About 0.5 g of polymer was precisely weighed, methylene chloride was added to dissolve the polymer, and 1 ml of 0.5 g/l methylene chloride solution of 4-(p-nitrobenzyl)pyridine (product of Wako Pure Chemical Industries, Ltd., special grade chemical) was added thereto to adjust the total amount of the mixture to 10 ml. Absorbance was measured at a wavelength of 440 nm by use of a spectrophotometer (U-3000 of Hitachi, Ltd.).

Separately, a calibration curve was prepared by use of a methylene chloride solution of phenyl chlorocarbonate (product of Wako Pure Chemical Industries, Ltd., special grade chemical), and a trace chlorine content derived from chloroformate groups in the sample was determined. The determination limit was a solid content of 0.2 ppm in terms of chlorine content.

(16) Terminal Hydroxyl Group Content:

After about 0.2 g of polymer was charged into a 25-ml measuring flask and precisely weighed, about 10 ml of methylene chloride was added to dissolve the polymer. After the polymer was dissolved, 10 ml of titanium tetrachloride solution and 4 ml of acetic acid solution were added, and methylene chloride was added to make the mixture reach the marked line. The titanium tetrachloride solution was prepared by charging 20 g of titanium tetrachloride and 0.2 g of acetic acid into a 500-ml measuring flask and adding methylene chloride to make the mixture reach the marked line. The acetic acid solution was prepared by charging 10 g of acetic acid into a 100-ml measuring flask and adding methylene chloride to make the mixture reach the marked line. After the sample solution was shaken well, absorbance at 500 nm was measured by use of water as a blank, and the hydroxyl group content was determined.

(17) Total Light Transmittance:

This was measured by use of MDH-300A of Nippon Denshoku Industries Co., Ltd. in accordance with ASTM D-1003.

(18) Cloudiness in Aluminum Evaporation:

An aluminum film having a thickness of 100 nm was evaporated on a sample plate having a size of 50 mm×90 mm×2 mm by a vacuum evaporation apparatus of DIAVAC LIMITED, and a change in the aluminum film after the film was left to stand in an atmosphere of 160° C. for 24 hours was observed. When cloudiness was found in the aluminum evaporated film, it was rated as "x", and when no change was found in the aluminum evaporated film, it was rated as "○".

(19) Reflow Resistance:

An test piece prepared by injection molding and having a thickness of 1.0 mm, a width of 10 mm and a length of 20 mm was dried under reduced pressure at 120° C. for 10 hours. This test piece was treated in a reflow furnace (TPF-20L of Asahi Engineering Co., Ltd.) using infrared radiation and hot air in combination. The heating temperature pattern was set so that a peak temperature of 250° C. lasted for 5 seconds after heating at 150° C. for 60 seconds, and a change in the color of the reflow-treated molded piece was visually evaluated. Those showing no change in color were rated as "○", and those showing a change in color were rated as "x".

(20) b Value of Monomer Solution:

10 g of sample was dissolved in 50 ml of ethanol, and the b value of the solution was measured in a sample tube having an optical path length of 30 mm by use of colorimeter 300A of Nippon Denshoku Industries Co., Ltd.

(21) Average Brightness (1):

A test piece having a length of 231 mm, a width of 321 mm and a thickness of 1 to 2 mm was installed in a 15-type direct-backlight unit. Brightness (cd/m$^2$) at 9 points on the test piece was measured by brightness photometer BM-7 of TOPCON CORPORATION, and the average thereof was taken as average brightness.

(22) Brightness Non-Uniformity:

The ratio of the minimum brightness to the maximum brightness out of the above results of measurements of brightness was taken as brightness non-uniformity.

brightness non-uniformity (%)=(minimum brightness/maximum brightness)×100

(23) Light Diffusibility:

Test pieces through which a cold cathode as a light source was not seen when installed in the above backlight unit were rated as "○", and test pieces through which a cold cathode as a light source was seen when installed in the above backlight unit were rated as "x".

(24) Change in Brightness Non-Uniformity:

Test pieces showing no change in brightness non-uniformity when used in a high temperature atmosphere of 140° C. were rated as "○", and test pieces showing a change in brightness non-uniformity when used in a high temperature atmosphere of 140° C. were rated as "x".

(25) Heat Resistance:

Test pieces which did not undergo deformation even when left to stand in an atmosphere of 160° C. for 24 hours were rated as "○", and test pieces which underwent deformation when left to stand in an atmosphere of 160° C. for 24 hours were rated as "x".

(26) Average Brightness (2):

An optical waveguide test piece having a length of 100 mm, a width of 100 mm and a thickness of 1 to 2 mm was installed in a backlight unit, irradiated with a cold cathode from the edge, brightness (cd/m$^2$) at 9 points on the test piece was measured by brightness photometer BM-7 of TOPCON CORPORATION, and the average thereof was taken as average brightness.

(27) Refractive Index:

This was measured by use of Abbe's refractometer.

Example 1

To a reactor equipped with a thermometer, agitator and reflux condenser, 190,500 parts of ion exchanged water and 105,400 parts of 25% sodium hydroxide solution were added. After 20 minutes after 43,560 parts of 9,9-bis(4-hydroxy-3-methylphenyl)fluorene (hereinafter may be abbreviated as "BCF" or "biscresol fluorene") having a fluorene-9-one content measured by the above HPLC analysis of 2.1 ppm, 11,260 parts of 2,2-bis(4-hydroxyphenyl) propane (hereinafter may be abbreviated as "BPA" or "bisphenol A") and 110 parts of hydrosulfite were dissolved, 178,400 parts of methylene chloride was added. Thereafter, under agitation, 22,810 parts of phosgene was blown into the mixture at 15 to 25° C. for 60 minutes. After completion of phosgene blowing, a solution prepared by dissolving 222.2 parts of p-t-butylphenol in 3,300 parts of methylene chloride and 13,200 parts of 25% sodium hydroxide solution were added. After emulsification, 40 parts of triethylamine was added, and the resulting mixture was stirred at 28 to 33° C. for 1 hour so as to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, the methylene chloride phase was concentrated and dehydrated to obtain a solution having a polycarbonate concentration of 20%. A polycarbonate obtained by removing the solvent from this solution showed a molar ratio between biscresol fluorene and bisphenol A constituents of 70:30 (polymer yield: 97%). Further, this polymer had an intrinsic viscosity of 0.675 and a Tg of 227° C. The content of fluorene-9-one in the obtained polymer was 2.3 ppm. This polycarbonate solution was cast on a moving stainless steel plate from a T die at 20° C., the temperature was gradually increased to evaporate methylene chloride, and the formed film was removed from the stainless steel plate and further heated to remove methylene chloride. Thereby, a film having a thickness of 200 μm was obtained. Casting film formability was good, and this film had a b value of 0.6.

Example 2

A polymer 20% solution showing a molar ratio between biscresol fluorene and bisphenol A constituents of 60:40 was obtained (polymer yield: 98%) in the same manner as in Example 1 except that the amount of biscresol fluorene was 37,200 parts and the amount of bisphenol A was 15,000 parts. This polymer had an intrinsic viscosity of 0.709 and a Tg of 218° C. The content of fluorene-9-one in the obtained polymer was 2.1 ppm. A film having a thickness of 200 μm was obtained from this polycarbonate solution in the same manner as in Example 1. Casting film formability was good, and this film had a b value of 0.5.

Example 3

A polymer 20% solution showing a molar ratio between biscresol fluorene and α,α'-bis(4-hydroxyphenyl)-m-diisopropylbenzene (hereinafter may be abbreviated as "BPM" or "bisphenol M") constituents of 70:30 was obtained (polymer yield: 97%) in the same manner as in Example 1 except that 17,089 parts by weight of bisphenol M was used in place of bisphenol A. This polymer had an intrinsic viscosity of 0.671 and a Tg of 209° C. The content of fluorene-9-one in the obtained polymer was 2.4 ppm. A film having a thickness of 200 μm was obtained from this polycarbonate solution in the same manner as in Example 1. Casting film formability was good, and this film had a b value of 0.6.

Example 4

To a reactor equipped with a thermometer, agitator and reflux condenser, 190,500 parts of ion exchanged water and 105,400 parts of 25% sodium hydroxide solution were added. After 43,560 parts of 9,9-bis(4-hydroxy-3-methylphenyl)fluorene having a fluorene-9-one content measured by the above HPLC analysis of 17 ppm, 11,260 parts of 2,2-bis(4-hydroxyphenyl)propane and 110 parts of hydrosulfite were dissolved, 178,400 parts of methylene chloride was added immediately. Thereafter, under agitation, 22,810 parts of phosgene was blown into the mixture at 15 to 25° C. for 60 minutes. After completion of phosgene blowing, a solution prepared by dissolving 222.2 parts of p-t-butylphenol in 3,300 parts of methylene chloride and 13,200 parts of 25% sodium hydroxide solution were added. After emulsification, 40 parts of triethylamine was added, and the resulting mixture was stirred at 28 to 33° C. for 1 hour so as to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, the methylene chloride phase was concentrated and dehydrated to obtain a solution having a polycarbonate concentration of 20%. A polycarbonate obtained by removing the solvent from this solution showed a molar ratio between biscresol fluorene and bisphenol A constituents of 70:30 (polymer yield: 97%). Further, this polymer had an intrinsic viscosity of 0.674 and a Tg of 226° C. The content of fluorene-9-one in the obtained polymer was 13 ppm. A film having a thickness of 200 μm was obtained from this polycarbonate solution in the same manner as in Example 1. This film had a b value of 0.9.

Example 5

A 20% polycarbonate solution (polymer yield: 95%) was obtained in the same manner as in Example 1 except that the reaction was carried out while nitrogen was blown into the reaction. This polymer had an intrinsic viscosity of 0.672 and a Tg of 225° C. Further, the content of fluorene-9-one in the obtained polymer was 1.5 ppm. A film having a thickness of 200 μm was obtained from this polycarbonate solution in the same manner as in Example 1. This film had a b value of 0.3.

Comparative Example 1

A 20% polycarbonate solution (polymer yield: 94%) was obtained in the same manner as in Example 1 except that methylene chloride was added after passage of at least 2.5 hours after biscresol fluorene, bisphenol A and hydrosulfite were dissolved. This polymer had an intrinsic viscosity of 0.669 and a Tg of 223° C. Further, the content of fluorene-9-one in the obtained polymer was 34 ppm. A film having a thickness of 200 μm was obtained from this polycarbonate solution in the same manner as in Example 1. This film had a b value of 1.6.

Comparative Example 2

A 20% polycarbonate solution (polymer yield: 95%) was obtained in the same manner as in Example 3 except that methylene chloride was added after passage of at least 2.5 hours after biscresol fluorene, bisphenol M and hydrosulfite were dissolved. This polymer had an intrinsic viscosity of 0.668 and a Tg of 209° C. Further, the content of fluorene-9-one in the obtained polymer was 41 ppm. A film having a thickness of 200 μm was obtained from this polycarbonate solution in the same manner as in Example 3. This film had a b value of 1.9.

Comparative Example 3

A 20% polycarbonate solution (polymer yield: 97%) was obtained in the same manner as in Example 4 except that the time spanning from dissolving an aromatic dihydroxy compound in an acid binding agent and a solvent completely to the start of its reaction with a carbonate precursor was 30 minutes. This polymer had an intrinsic viscosity of 0.673 and a Tg of 225° C. Further, the content of fluorene-9-one in the obtained polymer was 31 ppm. A film having a thickness of 200 μm was obtained from this polycarbonate solution in the same manner as in Example 4. This film had a b value of 1.6.

Comparative Example 4

A 20% polycarbonate solution (polymer yield: 95%) was obtained by use of the same reactor as used in Example 1 in the same manner as in Example 1 except that biscresol fluorene having a fluorene-9-one content of 35 ppm was used. This polymer had an intrinsic viscosity of 0.674 and a Tg of 226° C. Further, the content of fluorene-9-one in the obtained polymer was 67 ppm. A film having a thickness of 200 μm was obtained from this polycarbonate solution in the same manner as in Example 1. This film had a b value of 2.2.

TABLE 1

|  | BCF mol % | BPA mol % | BPM mol % | Tg ° C. | η | Fluorene-9-one Content of BCF ppm | Fluorene-9-one Content of Copolymer ppm | B Value of Film |
|---|---|---|---|---|---|---|---|---|
| Ex. 1 | 70 | 30 | 0 | 227 | 0.675 | 2.1 | 2.3 | 0.6 |
| Ex. 2 | 60 | 40 | 0 | 218 | 0.709 | 2.1 | 2.1 | 0.5 |
| Ex. 3 | 70 | 0 | 30 | 209 | 0.671 | 2.1 | 2.4 | 0.6 |
| Ex. 4 | 70 | 30 | 0 | 226 | 0.674 | 17.0 | 13.0 | 0.9 |
| Ex. 5 | 70 | 30 | 0 | 225 | 0.672 | 2.1 | 1.5 | 0.3 |
| C. Ex. 1 | 70 | 30 | 0 | 223 | 0.669 | 2.1 | 34.0 | 1.6 |

TABLE 1-continued

|  | BCF mol % | BPA mol % | BPM mol % | Tg °C. | η | Fluorene-9-one Content of BCF ppm | Fluorene-9-one Content of Copolymer ppm | B Value of Film |
|---|---|---|---|---|---|---|---|---|
| C. Ex. 2 | 70 | 0 | 30 | 209 | 0.668 | 2.1 | 41.0 | 1.9 |
| C. Ex. 3 | 70 | 30 | 0 | 225 | 0.673 | 17.0 | 31.0 | 1.6 |
| C. Ex. 4 | 70 | 30 | 0 | 226 | 0.674 | 35.0 | 67.0 | 2.2 |

Ex.: Example,
C. Ex.: Comparative Example

Examples 6 to 9 and Comparative Examples 5 to 9

Polycarbonate copolymers (a) and ultraviolet absorbers (b) used in these Examples and Comparative Examples are as follows.

(a) Polycarbonate Copolymer (PC Resin)

Production of Polycarbonate Copolymer—Case 1

To a reactor equipped with a thermometer, agitator and reflux condenser, 19,580 parts of ion exchanged water and 3,845 parts of 48% sodium hydroxide solution were added. After 20 minutes after 2,835 parts of bisphenol A, 1,175 parts of biscresol fluorene having a fluorene-9-one content measured by the above HPLC analysis of 2.1 ppm and 8.4 parts of hydrosulfite were dissolved, 13,209 parts of methylene chloride was added. Then, under agitation, 2,000 parts of phosgene was blown into the mixture at 18 to 20° C. for 60 minutes. After completion of phosgene blowing, 93.2 parts of p-t-butylphenol and 641 parts of 48% sodium hydroxide solution were added. Then, 2.0 parts of triethylamine was added, and the resulting mixture was stirred at 20 to 27° C. for 40 minutes to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, methylene chloride was evaporated by a kneader to obtain 4,250 parts of pale yellow polymer (abbreviated as "EX-PC1") having a molar ratio of bisphenol A to biscresol fluorene of 80:20, a specific viscosity of 0.370 and a Tg of 172° C. (yield: 95%). The content of fluorene-9-one in the obtained polymer was 1.5 ppm.

Production of Polycarbonate Copolymer—Case 2

To a reactor equipped with a thermometer, agitator and reflux condenser, 21,540 parts of ion exchanged water and 4,230 parts of 48% sodium hydroxide solution were added. After 20 minutes after 1,949 parts of bisphenol A, 3,231 parts of biscresol fluorene having a fluorene-9-one content measured by the above HPLC analysis of 2.1 ppm and 10.9 parts of hydrosulfite were dissolved, 14,530 parts of methylene chloride was added. Then, under agitation, 2,200 parts of phosgene was blown into the mixture at 16 to 20° C. for 60 minutes. After completion of phosgene blowing, 115.4 parts of p-t-butylphenol and 705 parts of 48% sodium hydroxide solution were added. Then, 2.6 parts of triethylamine was added, and the resulting mixture was stirred at 20 to 27° C. for 40 minutes to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, methylene chloride was evaporated by a kneader to obtain 5,500 parts of pale yellow polymer (abbreviated as "EX-PC2") having a molar ratio of bisphenol A to biscresol fluorene of 50:50, a specific viscosity of 0.280 and a Tg of 198° C. (yield: 95%). The content of fluorene-9-one in the obtained polymer was 2.0 ppm.

Production of Comparative Aromatic Polycarbonate Resin

To a reactor equipped with a thermometer, agitator and reflux condenser, 19,760 parts of ion exchanged water and 4,240 parts of 48% sodium hydroxide solution were added. After 5,010 parts of bisphenol A and 10.0 parts of hydrosulfite were dissolved and 12,510 parts of methylene chloride was added, 2,500 parts of phosgene was blown into the mixture under agitation at 18 to 20° C. over 60 minutes. After completion of phosgene blowing, 148.2 parts of p-t-butylphenol and 650 parts of 48% sodium hydroxide solution were added. Then, 5.5 parts of triethylamine was added, and the resulting mixture was stirred at 20 to 27° C. for 40 minutes to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, methylene chloride was evaporated by a kneader to obtain 5,380 parts of white bisphenol A homopolymer (abbreviated as "CEX-PC1") having a specific viscosity of 0.368 and a Tg of 145° C. (yield: 94%).

(b) Ultraviolet Absorber (UVA)

2,2'-p-phenylenebis(3,1-benzoxazine-4-one): CEi-P of Takemoto oil & fat. (abbreviated as "EX-UVA1")

2,2'-(4,4'-diphenylene)bis(3,1-benzoxazine-4-one): synthesized and used (abbreviated as "EX-UVA2")

1,4-bis(4-benzoyl-3-hydroxyphenoxy)butane: SHEESORB 151 of SHIPRO CO., LTD. (abbreviated as "CEX-UVA1")

2-[5-chloro(2H)-benzotriazole-2-yl]-4-methyl-6-(t-butyl) phenol: CINUBIN 326 of Ciba Specialty Chemicals K.K. (abbreviated as "CEX-UVA2")

Table 2 shows the absorbance at 360 nm ($A_{360\ nm}$) and absorbance at 400 nm ($A_{400\ nm}$) measured at an optical path length of 1 cm when dissolved in methylene chloride at a concentration of 10 mg/L of the ultraviolet absorbers, the glass transition temperatures (Tg) of EX-PC1 and EX-PC2 containing no ultraviolet absorber, and the glass transition temperatures (Tg') of aromatic polycarbonate resin compositions prepared by adding 2 parts by weight of the ultraviolet absorbers to 100 parts by weight of EX-PC1 and EX-PC2.

TABLE 2

| Type of PC Resins | Type of Ultraviolet Absorber | $A_{360\ nm}$ | $A_{400\ nm}$ | Tg °C. | Tg' °C. |
|---|---|---|---|---|---|
| EX-PC1 | EX-UVA1 | 0.645 | 0.001 | 172 | 169 |
| EX-PC2 |  |  |  | 198 | 196 |

TABLE 2-continued

| Type of PC Resins | Type of Ultraviolet Absorber | $A_{360 nm}$ | $A_{400 nm}$ | Tg °C. | Tg' °C. |
|---|---|---|---|---|---|
| EX-PC1 | CEX-UVA2 | 0.670 | 0.005 | 172 | 170 |
| EX-PC2 | | | | 198 | 197 |
| EX-PC1 | CEX-UVA1 | 0.099 | 0.001 | 172 | 166 |
| EX-PC2 | | | | 198 | 190 |
| EX-PC1 | CEX-UVA2 | 0.481 | 0.037 | 172 | 167 |
| EX-PC2 | | | | 198 | 193 |

Preparation of Polycarbonate Composition

To EX-PC1 and EX-PC2 obtained above, 0.0050% of 5,7-di-t-butyl-3-(3,4-dimethylphenyl)-3H-benzofurano-2-one, 0.050% of bis(2,4-dicumylphenyl)pentaerythritol diphosphite and 0.050% of pentaerythritol tetrastearate were added. Further, the ultraviolet absorbers shown in Table 3 were uniformly mixed into the mixtures by use of a tumbler. Then, the resulting mixtures were pelletized by a 30-mm-ϕ vented twin screw extruder (KTX-30 of Kobe Steel, Ltd.) at a cylinder temperature of 300° C. and a vacuum degree of 10 mmHg under deaeration. After the obtained pellets were dried at 120° C. for 5 hours, test sample plates having a thickness of 2 mm were prepared by use of an injection molding machine (SG150U of Sumitomo Heavy Industries, Ltd.) at a cylinder temperature of 320° C. and a mold temperature of 100° C. The results of evaluations are shown in Table 3.

As is clear from comparisons among the obtained test sample plates, it is understood that aromatic polycarbonate resin compositions comprising the polycarbonate copolymers of the present invention and the specific ultraviolet absorbers have excellent light resistance.

TABLE 3

| Item Unit | PC Resin | UVA | Amount of UVA wt % | Tg °C. | YI | $\Delta YI_0$ | $\Delta YI_1$ | $R_{YI}$ |
|---|---|---|---|---|---|---|---|---|
| Ex. 6 | EX-PC1 | EX-UVA1 | 0.3 | 171 | 1.2 | 16.5 | 4.2 | 75 |
| Ex. 7 | EX-PC1 | EX-UVA1 | 1.0 | 168 | 1.8 | 16.5 | 3.1 | 81 |
| Ex. 8 | EX-PC2 | EX-UVA1 | 1.0 | 194 | 5.7 | 23.5 | 7.2 | 69 |
| Ex. 9 | EX-PC1 | EX-UVA2 | 1.0 | 171 | 2.2 | 16.5 | 3.8 | 77 |
| C. Ex. 5 | EX-PC1 | — | — | 172 | 1.1 | 16.5 | 16.5 | 0 |
| C. Ex. 6 | EX-PC2 | — | — | 198 | 5.5 | 23.5 | 23.5 | 0 |
| C. Ex. 7 | EX-PC1 | CEX-UVA1 | 0.3 | 170 | 1.1 | 16.5 | 12.4 | 25 |
| C. Ex. 8 | EX-PC1 | CEX-UVA2 | 0.3 | 169 | 12.2 | 16.5 | 6.7 | 59 |
| C. Ex. 9 | CEX-PC1 | EX-UVA1 | 0.3 | 144 | 0.8 | 3.5 | 2.5 | 29 |

Example 10

To a reactor equipped with a thermometer, agitator and reflux condenser, 22,109 parts of ion exchanged water and 3,925 parts of 48% sodium hydroxide solution were added. After 20 minutes after 1,162 parts of 9,9-bis (4-hydroxy-3-methylphenyl) fluorene (hereinafter may be abbreviated as "biscresol fluorene") having a fluorene-9-one content measured by the above HPLC analysis of 2.1 ppm, 2,804 parts of 2,2-bis(4-hydroxyphenyl)propane (hereinafter may be abbreviated as "bisphenol A") and 130 parts of hydrosulfite were dissolved, 15,661 parts of methylene chloride was added. Then, 1,900 parts of phosgene was blown into the mixture under agitation at 15 to 25° C. for 60 minutes. After completion of phosgene blowing, a solution prepared by dissolving 92 parts of p-t-butylphenol in 330 parts of methylene chloride and 633 parts of 48% sodium hydroxide solution were added. After emulsification, 5 parts of triethylamine was added, and the resulting mixture was stirred at 28 to 33° C. for 1 hour so as to complete the reaction. After completion of the reaction, the product was diluted with methylene chloride and then rinsed with water repeatedly until the content of hydrosulfite remaining in the water phase became 5 ppm or less. Then, the resulting product was rendered acidic with hydrochloric acid and rinsed with water again until it became neutral. After dehydration, methylene chloride was removed so as to obtain a polymer having a molar ratio between biscresol fluorene and bisphenol A constituents of 20:80 (polymer yield: 97%). This polymer had a glass transition temperature (Tg) of 165° C. and a viscosity average molecular weight (Mv) of 18,500. The content of fluorene-9-one in the obtained polymer was 1.5 ppm. The content of sulfur in this polymer was 12 ppm in terms of sulfur atom. Then, 0.1 wt % of "Irgafos 168" of Ciba Specialty Chemicals was added to this polymer, and the mixture was extruded by use of a 30-ϕ single screw extruder at a cylinder temperature of 300° C. so as to pelletize it. After the pellets were plasticized by use of an injection molding machine (Nikko Anchor V-17-65 of Japan Steel Works, Ltd.) at a cylinder temperature of 340° C., a test piece having a thickness of 2 mm was obtained. At that time, a sulfur odor was not sensed. Further, the b value of the test piece was good at 1.4. The results are shown in Table 4.

Example 11

To the same reactor as used in Example 10, 23,272 parts of ion exchanged water and 3,999 parts of 48% sodium hydroxide were added. After 20 minutes after 1,845 parts of bisphenol A, 3,058 parts of biscresol fluorene having a fluorene-9-one content measured by the above HPLC analysis of 2.1 ppm and 140 parts of hydrosulfite were dissolved, 16,485 parts of methylene chloride was added. Then, 1,920 parts of phosgene was blown into the mixture under agitation at 15 to 20° C. for 60 minutes. After completion of phosgene blowing, 97 parts of p-t-butylphenol and 666 parts of 48% sodium hydroxide solution were added. After emulsification, 5.6 parts of triethylamine was added, and the resulting mixture was stirred at 28 to 33° C. for 1 hour so as to complete the reaction. The product was treated in the same manner as in Example 10 so as to obtain a polymer having a molar ratio between biscresol fluorene and bisphenol A of 50:50 (yield: 96%). This polymer had a glass transition temperature (Tg) of 197° C. and a viscosity average molecular weight (Mv) of 15,500. The content of fluorene-9-one in the obtained polymer was 2.1 ppm. The content of sulfur in this polymer was 11 ppm in terms of sulfur atom. Then, 0.1 wt % of "Irgafos 168" of Ciba Specialty Chemicals was added to this polymer, and the mixture was extruded by use of a 30-ϕ single screw extruder at a cylinder temperature of 300° C. so as to pelletize it. After the pellets were plasticized by use of an injection molding machine (Nikko Anchor V-17-65 of Japan Steel Works, Ltd.) at a cylinder temperature of 340° C., a test piece having a thickness of 2 mm was obtained. At that time, a sulfur odor was not sensed. Further, the b value of the test piece was good at 1.5. The results are shown in Table 4.

Example 12

To the same reactor as used in Example 10, 35,315 parts of ion exchanged water and 3,920 parts of 48% sodium hydroxide were added. After 20 minutes after 2,954.9 parts of α,α'-bis(4-hydroxyphenyl)-m-diisopropylbenzene (abbreviated as "bisphenol M"), 3,228.1 parts of biscresol fluorene having a fluorene-9-one content measured by the above HPLC analysis of 2.1 ppm and 150 parts of hydrosulfite were dissolved, 12,775 parts of methylene chloride was added. Then, 1,946 parts of phosgene was blown into the mixture under agitation at 15 to 20° C. for 60 minutes. After completion of phosgene blowing, 108.5 parts of p-t-butylphenol and 710.5 parts of 48% sodium hydroxide solution were added. After emulsification, 4.55 parts of triethylamine was added, and the resulting mixture was stirred at 28 to 33° C. for 1 hour so as to complete the reaction. The product was treated in the same manner as in Example 10 so as to obtain a polymer having a molar ratio between bisphenol M and biscresol fluorene constituents of 50:50 (yield: 98%). This polymer had a glass transition temperature (Tg) of 180° C. and a viscosity average molecular weight (Mv) of 13,200. The content of fluorene-9-one in the obtained polymer was 2.1 ppm. The content of sulfur in this polymer was 15 ppm in terms of sulfur atom. Then, 0.1 wt % of "Irgafos 168" of Ciba Specialty Chemicals was added to this polymer, and the mixture was extruded by use of a 30-ϕ single screw extruder at a cylinder temperature of 300° C. so as to pelletize it. After the pellets were plasticized by use of an injection molding machine (Nikko Anchor V-17-65 of Japan Steel Works, Ltd.) at a cylinder temperature of 340° C., a test piece having a thickness of 2 mm was obtained. At that time, a sulfur odor was not sensed. Further, the b value of the test piece was good at 1.6. The results are shown in Table 4.

TABLE 4

|  | Tg (° C.) | Sulfur Content (ppm) | b Value | Odor |
|---|---|---|---|---|
| Example 10 | 165 | 12 | 1.4 | None |
| Example 11 | 197 | 11 | 1.5 | None |
| Example 12 | 180 | 15 | 1.6 | None |

Example 13

To a reactor equipped with a thermometer, agitator and reflux condenser, 19,580 parts of ion exchanged water and 4,486 parts of 48% sodium hydroxide solution were added. After 20 minutes after 2,349.7 parts of 9,9-bis(4-hydroxy-3-methylphenyl)fluorene having a fluorene-9-one content measured by the above HPLC analysis of 2.1 ppm and a purity of 99.9%, 2,125.9 parts of 2,2-bis(4-hydroxyphenyl)propane and 13 parts of hydrosulfite were dissolved, 13,210 parts of methylene chloride was added. Then, 2,000 parts of phosgene was blown into the mixture under agitation at 15 to 25° C. for 60 minutes. After completion of phosgene blowing, a solution prepared by dissolving 104.9 parts of p-t-butylphenol in 500 parts of methylene chloride and 640.8 parts of 48% sodium hydroxide solution were added. After emulsification, 7.4 parts of triethylamine was added, and the resulting mixture was stirred at 28 to 33° C. for 1 hour so as to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, the methylene chloride phase was concentrated and dehydrated to obtain a solution having a polycarbonate concentration of 20%. A polycarbonate obtained by removing the solvent from this solution showed a molar ratio between biscresol fluorene and bisphenol A constituents of 40:60 (polymer yield: 97%). Further, this polymer had an intrinsic viscosity of 0.312 and a Tg of 189° C. The content of fluorene-9-one in the obtained polymer was 2.0 ppm. Further, the content of trace chlorine based on chloroformate groups in the polymer was 0.3 ppm, and the content of hydroxyl groups was 70.7 ppm. To 100 parts of this polymer, 0.05 parts of tetrakis(2,4-di-t-butylphenyl)-4,4-diphenylene phosphonite, 0.01 parts of octadecyl-3-(3,5-di-t-butyl-4-hydroxyphenyl)propionate and 0.05 parts of monoglyceride stearate were added, and the resulting mixture was melt-extruded from a vented extruder at an extruder temperature of 280 to 320° C. and a die temperature of 290 to 330° C. with the degree of vacuum of the vent kept at 2.7 kPa so as to pelletize it. After the pellets were dried at 120° C. for 4 hours, they were injection-molded into a test piece having a size of 50 mm×90 mm×2 mm. The obtained molded piece had a total light transmittance of 89% and a b value of 1.4. When the molded piece was subjected to aluminum evaporation and a heat treatment and the surface condition thereof was visually evaluated, no cloudiness was observed. Further, no change was observed with respect to the color of the molded piece after a reflow treatment. The results are shown in Table 5.

Example 14

A polymer having a molar ratio between biscresol fluorene and bisphenol A of 70:30 was obtained in the same manner as in Example 13 except that the amount of biscresol fluorene was 4,111.9 parts and the amount of bisphenol A was 1,062.9 parts. This polymer had a specific viscosity of 0.262 and a Tg of 215° C. The content of fluorene-9-one in the obtained polymer was 2.3 ppm. This polymer was pelletized in the same manner as in Example 13. The results of evaluations made on the obtained molded piece are shown in Table 5.

Example 15

A polymer having a molar ratio between biscresol fluorene and bisphenol A of 40:60 was obtained in the same manner as in Example 13 except that biscresol fluorene having a fluorene-9-one content measured by the above HPLC analysis of 2.1 ppm and a purity of 99.2% was used. This polymer had a specific viscosity of 0.296 and a Tg of 189° C. The content of fluorene-9-one in the obtained polymer was 2.0 ppm. This polymer was pelletized in the same manner as in Example 13. The results of evaluations made on the obtained molded piece are shown in Table 5.

TABLE 5

| | Purity of BCF (%) | Composition of Polymer (%) | | Specific Viscosity | Tg (° C.) | Content of Chlorine Based on Chloroformate Group (ppm) |
|---|---|---|---|---|---|---|
| | | BCF | BPA | | | |
| Ex. 13 | 99.9 | 40 | 60 | 0.312 | 189 | 0.3 |
| Ex. 14 | 99.9 | 70 | 30 | 0.262 | 215 | 0.6 |
| Ex. 15 | 99.2 | 40 | 60 | 0.296 | 189 | 5.0 |

| | Content of Hydroxyl Group (ppm) | Total Light Transmittance (%) | b Value of Molded Piece | Cloudiness in Aluminum Evaporation | Reflow Resistance |
|---|---|---|---|---|---|
| Ex.13 | 70.7 | 89 | 1.4 | ○ | ○ |
| Ex.14 | 57.7 | 89 | 2.3 | ○ | ○ |
| Ex.15 | 103.2 | 89 | 1.6 | ○ | ○ |

Ex.: Example

Examples 16 to 20

Synthesis Example 1

To a reactor equipped with a thermometer, agitator and reflux condenser, 24,623 parts of ion exchanged water and 4,153 parts of 48% sodium hydroxide solution were added. After 20 minutes after 1,936.9 parts of 9,9-bis(4-hydroxy-3-methylphenyl)fluorene having a fluorene-9-one content measured by the above HPLC analysis of 2.1 ppm, 2,726 parts of 2,2-bis(4-hydroxyphenyl)propane and 8 parts of hydrosulfite were dissolved, 18,188 parts of methylene chloride was added. Thereafter, 1,994 parts of the above phosgene was blown into the mixture under agitation at 15 to 25° C. for 60 minutes. After completion of phosgene blowing, a solution prepared by dissolving 102.5 parts of p-t-butylphenol in 330 parts of methylene chloride and 692.1 parts of 48% sodium hydroxide solution were added. After emulsification, 5.8 parts of triethylamine was added, and the resulting mixture was stirred at 28 to 33° C. for 1 hour so as to complete the reaction. After completion of the reaction, the product was diluted with methylene chloride, rinsed with water, rendered acidic with hydrochloric acid and rinsed with water, and when the electric conductivity of the water phase became nearly the same as that of ion exchanged water, the methylene chloride phase was concentrated and dehydrated to obtain a solution having a polycarbonate concentration of 20%. A polycarbonate obtained by removing the solvent from this solution showed a molar ratio between biscresol fluorene and bisphenol A constituents of 30:70 (polymer yield: 97%). Further, this polymer had an intrinsic viscosity of 0.337 and a Tg of 190° C. The content of fluorene-9-one in the obtained polymer was 1.9 ppm. This polymer is referred to as polycarbonate A.

Synthesis Example 2

5,300 parts of polymer having a molar ratio between biscresol fluorene and bisphenol A of 50:50 was obtained in the same manner as in Synthesis Example 1 except that the amount of biscresol fluorene was 3,171.4 parts and the amount of bisphenol A was 1,913 parts (yield: 96%). This polymer had a specific viscosity of 0.320 and a Tg of 205° C. The content of fluorene-9-one in the obtained polymer was 2.1 ppm. This polymer is referred to as polycarbonate B.

Synthesis Example 3

To a reactor equipped with a thermometer, agitator and reflux condenser, 35,315 parts of ion exchanged water and 3,920 parts of 48% sodium hydroxide solution were added. After 20 minutes after 3,228.1 parts of 9,9-bis(4-hydroxy-3-methylphenyl)fluorene having a fluorene-9-one content measured by the above HPLC analysis of 2.1 ppm, 2,954.9 parts of α,α'-bis(4-hydroxyphenyl)-m-diisopropylbenzene and 14 parts of hydrosulfite were dissolved, 12,775 parts of methylene chloride was added. Thereafter, 1,946 parts of the above phosgene was blown into the mixture under agitation at 15 to 25° C. for 45 minutes. After completion of phosgene blowing, a solution prepared by dissolving 108.5 parts of p-t-butylphenol in 330 parts of methylene chloride and 710.5 parts of 48% sodium hydroxide solution were added. After emulsification, 4.55 parts of triethylamine was added, and the resulting mixture was stirred at 28 to 33° C. for 1 hour so as to complete the reaction. The product was treated in the same manner as in Synthesis Example 1 to obtain a polymer having a molar ratio between bisphenol M and biscresol fluorene constituents of 50:50 (yield: 98%). This polymer had a specific viscosity of 0.250 and a Tg of 180° C. The content of fluorene-9-one in the obtained polymer was 2.1 ppm. This polymer is referred to as polycarbonate C.

Examples 16 to 20

To the polycarbonate resins obtained in Synthesis Examples 1 to 3, 0.05 parts of tris(2,4-di-t-butylphenyl) phosphite, 0.01 parts of octadecyl-3-(3,5-di-t-butyl-4-hydroxyphenyl)propionate and 0.03 parts of pentaerythritol tetrastearate were added. Then, to the obtained mixtures, transparent fine particles, a fluorescent brightening agent (KAYALIGHT OS of NIPPON KAYAKU KOGYO CO., LTD.) and 2,2'-p-phenylenebis(3,1-benzoxazine-4-one) as an ultraviolet absorber whose amounts were adjusted to those shown in Table 6 were added. The resulting mixtures were melt-extruded into a light diffusing plate having a width of 1,000 mm from a vented T-die extruder at an extruder temperature of 280 to 320° C. and a die temperature of 290 to 330° C. with the degree of vacuum of the vent kept at 27 kPa. The results of evaluations are shown in Table 6.

TABLE 6

|  | Ex. 16 | Ex. 17 | Ex. 18 | Ex. 19 | Ex. 20 |
| --- | --- | --- | --- | --- | --- |
| Thickness (mm) | 2 | 2 | 2 | 2 | 1 |
| PC (parts by weight) | A 96.5 | A 96.5 | B 96.5 | C 96.5 | A 96.5 |
| Transparent Particles (parts by weight) | i 3.5 | ii 3.5 | i 3.5 | i 3.5 | i 3.5 |
| Fluorescent Brightening Agent (parts by weight) | — | 0.02 | 0.02 | 0.02 | 0.02 |
| Ultraviolet Absorber (parts by weight) | 1.0 | 1.0 | 1.0 | 1.0 | 1.0 |
| Total Light Transmittance (%) | 54 | 56 | 55 | 54 | 70 |
| Average Brightness (cd/m$^2$) | 5,500 | 5,600 | 5,600 | 5,500 | 5,700 |
| Brightness Non-uniformity (%) | 91 | 91 | 92 | 92 | 92 |
| Diffusibility | ○ | ○ | ○ | ○ | ○ |
| Change in Brightness Non-uniformity | ○ | ○ | ○ | ○ | ○ |
| Heat Resistance | ○ | ○ | ○ | ○ | ○ |

Ex.: Example
i: PARAROID EXL-5136 of Rohm & Haas (average particle diameter: 7 μm)
ii: TOSPAL 120 of GE Toshiba Silicones (average particle diameter: 2 μm)
Ultraviolet Absorber: 2,2'-p-phenylenebis(3,1-benzoxazine-4-one)

Examples 21 to 24

In the above Examples 16 to 20, 0.05 parts of tris(2,4-di-t-butylphenyl)phosphite, 0.01 parts of octadecyl-3-(3,5-di-t-butyl-4-hydroxyphenyl)propionate and 0.03 parts of pentaerythritol tetrastearate were added to the polycarbonate resins obtained in Synthesis Examples 1 to 3. Then, to the resulting mixtures, a fluorescent brightening agent (KAYALIGHT OS of NIPPON KAYAKU KOGYO CO., LTD.) and 2,2'-p-phenylenebis(3,1-benzoxazine-4-one) as an ultraviolet absorber whose amounts were adjusted to those shown in Table 7 were added. The resulting mixtures were melt-extruded from a vented extruder at an extruder temperature of 280 to 320° C. and a die temperature of 290 to 330° C. with the degree of vacuum of the vent kept at 27 kPa so as to pelletize it. After the pellets were dried at 120° C. for 4 hours, a microprism stamper having a height of 50 μm was inserted into a cavity having a size of 100 mm×100 mm×2 mm, and an optical waveguide was molded at a cylinder temperature of 330° C. and a mold temperature of 117° C. The results of evaluations made on the obtained optical waveguide are shown in Table 7.

TABLE 7

| | PC (parts by weight) | Ultraviolet Absorber (parts by weight) | Fluorescent Brightening Agent (parts by weight) | Light Guidability Average Brightness (cd/m$^2$) | Brightness Non-uniformity (%) | Refractive Index |
|---|---|---|---|---|---|---|
| Ex. 21 | A 100 | 1.0 | 0 | 5,900 | 95 | 1.60 |
| Ex. 22 | B 100 | 1.0 | 0 | 5,700 | 95 | 1.62 |
| Ex. 23 | C 100 | 1.0 | 0 | 5,600 | 94 | 1.62 |
| Ex. 24 | A 100 | 1.0 | 0.02 | 5,800 | 96 | 1.60 |

Ex.: Example

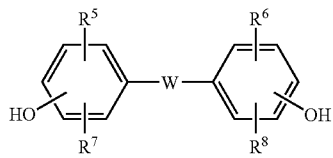

wherein $R^5$ to $R^8$ are each independently a hydrogen atom, a hydrocarbon group with 1 to 9 carbon atoms which may contain an aromatic group, or a halogen atom, and W is a single bond, a hydrocarbon group with 1 to 20 carbon atoms which may contain an aromatic group or an O, S, SO, SO$_2$, CO or COO group, and wherein a content of fluorene-9-one in the polycarbonate copolymer is not higher than 15 ppm.

2. The copolymer of claim 1, wherein the content of fluorene-9-one in the polycarbonate copolymer is not higher than 5 ppm.

What is claimed is:

1. A polycarbonate copolymer (A) comprising an aromatic dihydroxy component, wherein the aromatic dihydroxy component comprises 5 to 95 mol % of fluorene-skeleton-containing dihydroxy compound (1) represented by the following general formula [1]:

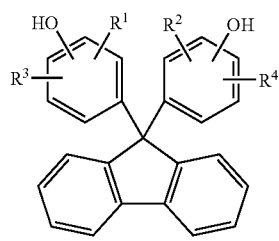

wherein $R^1$ to $R^4$ are each independently a hydrogen atom, a hydrocarbon group with 1 to 9 carbon atoms which may contain an aromatic group, or a halogen atom, and 95 to 5 mol % of dihydroxy compound (2) represented by the following general formula [2]:

3. The copolymer of claim 1, wherein the aromatic dihydroxy component comprises 15 to 85 mol % of the fluorene-skeleton-containing dihydroxy compound represented by the general formula [1] and 85 to 15 mol % of the dihydroxy compound (2) represented by the general formula [2].

4. The copolymer of claim 1, wherein the fluorene-skeleton-containing dihydroxy compound represented by the general formula [1] is 9,9-bis(4-hydroxyphenyl)fluorene or 9,9-bis(4-hydroxy-3-methylphenyl)fluorene.

5. The copolymer of claim 1, wherein the dihydroxy compound represented by the general formula [2] is at least one selected from the group consisting of 2,2-bis(4-hydroxyphenyl)propane, 2,2-bis(4-hydroxy-3-methylphenyl)propane, α,α'-bis(4-hydroxyphenyl)-m-diisopropylbenzene and 1,1-bis(4-hydroxyphenyl)cyclohexane.

6. The copolymer of claim 1, showing a b value of 5.0 or less when a solution prepared by dissolving 5 g of the copolymer in 50 ml of methylene chloride in a light blocking condition is measured at an optical path length of 30 mm.

7. The copolymer of claim 1, having a sulfur compound content of not higher than 50 ppm in terms of sulfur atom.

8. The copolymer of claim 1, having a chlorine content of not higher than 10 ppm based on terminal chloroformate groups and a terminal hydroxyl group (OH) content of not higher than 250 ppm of the copolymer.

9. A method of producing the polycarbonate copolymer of claim 1, comprising subjecting the fluorene-skeleton-containing dihydroxy compound (1) represented by the general formula [1] and the dihydroxy compound (2) represented by the general formula [2] to a polymerization reaction in an organic solvent in the presence of phosgene and an acid binding agent, wherein the polymerization reaction is carried out substantially in the absence of molecular oxygen.

10. A polycarbonate composition comprising: A) 100 parts by weight of polycarbonate copolymer (A), and B) 0.01 to 5 parts by weight of ultraviolet absorber (B),
wherein the polycarbonate copolymer (A) comprises an aromatic dihydroxy component,
wherein the aromatic dihydroxy component comprises 5 to 95 mol % of fluorene-skeleton-containing dihydroxy compound (1) represented by the following general formula [1]:

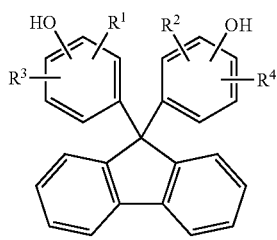

[1]

wherein $R^1$ to $R^4$ are each independently a hydrogen atom, a hydrocarbon group with 1 to 9 carbon atoms which may contain an aromatic group, or a halogen atom, and
95 to 5 mol % of dihydroxy compound (2) represented by the following general formula [2]:

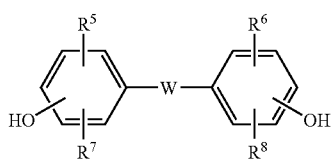

[2]

wherein $R^5$ to $R^8$ are each independently a hydrogen atom, a hydrocarbon group with 1 to 9 carbon atoms which may contain an aromatic group, or a halogen atom, and W is a single bond, a hydrocarbon group with 1 to 20 carbon atoms which may contain an aromatic group or an O, SO, SO, $SO_2$, CO or COO group, and
wherein the content of fluorene-9-one in the polycarbonate copolymer is not higher than 15 ppm.

11. The composition of claim 10, wherein the ultraviolet absorber (B) is uniformly dispersible in the polycarbonate copolymer (A) and is stable under melt molding conditions of the copolymer (A).

12. The composition of claim 10, wherein when an amount of change in Yellow Index (YI) after a 2-mm-thick molded plate formed from the polycarbonate copolymer (A) is exposed to a mercury lamp of 300 to 400 nm with an exposure intensity of 15 mW/cm² for 7 days is $\Delta YI_0$, a change in Yellow Index after a 2-mm-thick molded plate formed from the polycarbonate resin composition comprising the polycarbonate copolymer (A) and the ultraviolet absorber (B) is exposed to a mercury lamp of 300 to 400 nm with an exposure intensity of 15 mW/cm² for 7 days is $\Delta YI_1$, and the degree ($R_{YT}$) of light resistance improving effect by the ultraviolet absorber (B) is expressed as $R_{YT}=(1-\Delta YI_1/\Delta YI_0)\times 100(\%)$, $R_{YT} \geq 50\%$ holds.

13. The composition of claim 10, wherein the ultraviolet absorber (B) is an ultraviolet absorber showing an absorbance ($A_{360nm}$) at 360 nm measured at an optical path length of 1 cm of not lower than 0.5 when dissolved in methylene chloride at a concentration of 10 mg/L and an absorbance ($A_{400nm}$) at 400 nm measured at an optical path length of 1 cm of not higher than 0.01 when dissolved in methylene chloride at a concentration of 10 mg/L.

14. The composition of claim 10, wherein when the glass transition temperature of the polycarbonate composition containing 2 parts by weight of the ultraviolet absorber (B) based on 100 parts by weight of the polycarbonate copolymer (A) is Tg' and the glass transition temperature of the polycarbonate copolymer (B) containing no ultraviolet absorber (B) is Tg, Tg is 150° C. or higher and satisfies Tg-Tg'≦5° C.

15. The composition of claim 10, wherein the ultraviolet absorber (B) is a benzotriazole, benzophenone, triazine or benzoxazine based ultraviolet absorber.

16. The composition of claim 10, wherein the ultraviolet absorber (B) is a benzoxazine based ultraviolet absorber represented by the following general formula [3]:

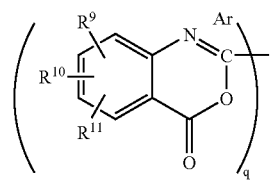

[3]

wherein $R^9$ to $R^{11}$ each independently represent a hydrogen atom, a hydrocarbon group with 1 to 9 carbon atoms which may contain an aromatic hydrocarbon group or a halogen atom, Ar represents a q-valent aromatic hydrocarbon group having 6 to 15 carbon atoms, and q represents an integer of 1, 2 or 3.

17. A molded article formed from the polycarbonate copolymer (A) of claim 1.

18. A film or sheet formed from the polycarbonate copolymer (A) of claim 1.

19. A molded article formed from the polycarbonate composition of claim 10.

20. A film or sheet formed from the polycarbonate composition of claim 10.

21. A light-proof molded article comprising a molded article formed from the polycarbonate copolymer (A) of claim 1 and a layer comprising a polymer composition containing an ultraviolet absorber, the layer being formed on the molded article.

22. A composite film or sheet comprising a film or sheet formed from the polycarbonate copolymer (A) of claim 1 and a layer comprising a polycarbonate composition containing an ultraviolet absorber, the layer being laminated on one or both surfaces of the film or sheet.

23. A light diffusing plate formed from a polycarbonate composition comprising 99.7 to 80 parts by weight of the polycarbonate copolymer (A) of claim 1 and 0.3 to 20 parts by weight of transparent fine particles.

24. The light diffusing plate of claim 23, wherein the polycarbonate composition further contains 0.01 to 5 parts by weight of the ultraviolet absorber (B) based on 100 parts by weight of the polycarbonate copolymer (A).

25. The light diffusing plate of claim 23, wherein the polycarbonate composition further contains 0.0005 to 0.1 parts by weight of fluorescent brightening agent based on 100 parts by weight of the polycarbonate copolymer (A).

26. The light diffusing plate of claim 23, wherein the transparent fine particles have an average particle diameter of 1 to 30 μm.

* * * * *